US011789445B2

(12) United States Patent
Huang et al.

(10) Patent No.: US 11,789,445 B2
(45) Date of Patent: *Oct. 17, 2023

(54) REMOTE CONTROL SYSTEM FOR TRAINING DEEP NEURAL NETWORKS IN AUTONOMOUS MACHINE APPLICATIONS

(71) Applicant: NVIDIA Corporation, Santa Clara, CA (US)

(72) Inventors: Jen-Hsun Huang, Los Altos Hills, CA (US); Prajakta Gudadhe, Los Gatos, CA (US); Justin Ebert, Lafayette, CO (US); Dane Johnston, High Ridge, MO (US)

(73) Assignee: NVIDIA Corporation, Santa Clara, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/379,704

(22) Filed: Jul. 19, 2021

(65) Prior Publication Data

US 2021/0349460 A1   Nov. 11, 2021

Related U.S. Application Data

(63) Continuation of application No. 16/366,506, filed on Mar. 27, 2019, now Pat. No. 11,099,558.

(Continued)

(51) Int. Cl.
*G05D 1/00* (2006.01)
*G06F 3/01* (2006.01)
(Continued)

(52) U.S. Cl.
CPC ......... *G05D 1/0044* (2013.01); *G02B 27/017* (2013.01); *G05D 1/0016* (2013.01);
(Continued)

(58) Field of Classification Search
CPC ...... G05D 1/00; G05D 1/0206; G05D 1/0274; G05D 1/02; G06T 19/006; G06T 15/20;
(Continued)

(56) References Cited

U.S. PATENT DOCUMENTS 9,568,995 B1 *   2/2017   Lian .................. G06T 15/20
9,987,983 B2 *   6/2018   Lewis ................ G06K 9/6202
(Continued)

FOREIGN PATENT DOCUMENTS

CN     2450862 A1 *   5/2012   ............. A63H 27/12
CN     104029825 A *   9/2014   ............... B64F 5/00
(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Yuri Kan
(74) *Attorney, Agent, or Firm* — Taylor English Duma L.L.P.

(57) ABSTRACT

In various examples, at least partial control of a vehicle may be transferred to a control system remote from the vehicle. Sensor data may be received from a sensor(s) of the vehicle and the sensor data may be encoded to generate encoded sensor data. The encoded sensor data may be transmitted to the control system for display on a virtual reality headset of the control system. Control data may be received by the vehicle and from the control system that may be representative of a control input(s) from the control system, and (Continued)

actuation by an actuation component(s) of the vehicle may be caused based on the control input.

20 Claims, 14 Drawing Sheets

Related U.S. Application Data

(60) Provisional application No. 62/648,493, filed on Mar. 27, 2018.

(51) Int. Cl.
| | |
|---|---|
| *G01C 21/26* | (2006.01) |
| *G07C 5/00* | (2006.01) |
| *G06T 17/05* | (2011.01) |
| *G02B 27/01* | (2006.01) |
| *G05D 1/02* | (2020.01) |

(52) U.S. Cl.
CPC ............ *G05D 1/0221* (2013.01); *G06F 3/011* (2013.01); *G06T 17/05* (2013.01); *G07C 5/008* (2013.01); *G05D 2201/0213* (2013.01)

(58) Field of Classification Search
CPC ... G06T 17/05; B60T 13/665; H04N 5/23206; B64F 5/00; A63H 27/12; G01C 21/26; G06F 3/01; G06F 3/00; G06F 3/011
See application file for complete search history.

(56) References Cited

U.S. PATENT DOCUMENTS

| | | | |
|---|---|---|---|
| 10,885,698 B2 | 1/2021 | Muthler et al. | |
| 11,099,558 B2* | 8/2021 | Huang | G06T 17/05 |
| 2009/0185617 A1* | 7/2009 | Houghton | H04N 5/23206 375/240.01 |
| 2009/0276105 A1* | 11/2009 | Lacaze | G05D 1/0206 701/2 |
| 2016/0313732 A1* | 10/2016 | Seydoux | G06T 19/006 |
| 2016/0321074 A1 | 11/2016 | Hung et al. | |
| 2017/0255198 A1* | 9/2017 | Rodriguez | G05D 1/0274 |
| 2018/0001474 A1 | 1/2018 | Sinyavskiy et al. | |
| 2018/0121273 A1 | 5/2018 | Fortino et al. | |
| 2018/0273003 A1* | 9/2018 | Aurich | B60T 13/665 |
| 2018/0370540 A1 | 12/2018 | Yousuf et al. | |

FOREIGN PATENT DOCUMENTS

| | | | | |
|---|---|---|---|---|
| CN | 104029825 A | | 9/2014 | |
| CN | 107703937 A | * | 2/2018 | G05D 1/02 |
| EP | 2 450 862 A1 | | 5/2012 | |
| EP | 2450862 A1 | | 5/2012 | |
| EP | 3 188 161 A1 | | 7/2017 | |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
"Programmable Vision Accelerator", U.S. Appl. No. 62/156,167, filed May 1, 2015.
"Programmable Vision Accelerator", U.S. Appl. No. 15/141,703, filed Apr. 28, 2016.
"Reliability Enhancement Systems and Methods", U.S. Appl. No. 15/338,247, filed Oct. 28, 2016.
"Methodology of Using a Single Controller (ECU) For a Fault-Tolerant/Fail-Operational SelfDriving System", U.S. Appl. No. 62/524,283, filed Jun. 23, 2017.
"Systems and Methods for Safe and Reliable Autonomous Vehicles", U.S. Appl. No. 62/584,549, filed Nov. 10, 2017.
"System and Method for Controlling Autonomous Vehicles", U.S. Appl. No. 62/614,466, filed Jan. 7, 2018.
"System and Method for Safe Operation of Autonomous Vehicles", U.S. Appl. No. 62/625,351, filed Feb. 2, 2018.
"Conservative Control for Zone Driving of Autonomous Vehicles Using Safe Time of Arrival", U.S. Appl. No. 62/628,831, filed Feb. 9, 2018.
"System and Method for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles" U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Convolutional Neural Networks to Detect Drivable Freespace for Autonomous Vehicles", U.S. Appl. No. 62/643,665, filed Mar. 15, 2018.
"Geometric Shadow Filter for Denoising Ray-Traced Shadows", U.S. Appl. No. 62/644,385, filed Mar. 17, 2018.
"Energy Based Reflection Filter for Denoising Ray-Traced Glossy Reflections", U.S. Appl. No. 62/644,386, filed Mar. 17, 2018.
"Distance Based Ambient Occlusion Filter for Denoising Ambient Occlusions", U.S. Appl. No. 62/644,601, filed Mar. 17, 2018.
"Adaptive Occlusion Sampling of Rectangular Area Lights with Voxel Cone Tracing", U.S. Appl. No. 62/644,806, filed Mar. 19, 2018.
"Deep Neural Network for Estimating Depth from Stereo Using Semi-Supervised Learning", U.S. Appl. No. 62/646,148, filed Mar. 21, 2018.
"Video Prediction Using Spatially Displaced Convolution", U.S. Appl. No. 62/646,309, filed Mar. 21, 2018.
"Video Prediction Using Spatially Displaced Convolution", U.S. Appl. No. 62/647,545, filed Mar. 23, 2018.
"System and Methods for Advanced AI-Assisted Vehicles", U.S. Appl. No. 62/648,358, filed Mar. 26, 2018.
"System and Method for Training, Testing, Verifying, and Validating Autonomous and SemiAutonomous Vehicles", U.S. Appl. No. 62/648,399, filed Mar. 27, 2018.
Huang, Jen-Hsun; Non-Final Office Action for U.S. Appl. No. 17/379,691, filed Jul. 19, 2021, dated Mar. 3, 2023, 14 pgs.
Huang, et al.; Notice of Allowance for U.S. Appl. No. 17/379,691, filed Jul. 19, 2021, dated Jun. 14, 2023, 14 pgs.

* cited by examiner

REMOTE CONTROL SYSTEM FOR TRAINING DEEP NEURAL NETWORKS IN AUTONOMOUS MACHINE APPLICATIONS

CROSS-REFERENCE TO RELATED APPLICATIONS

This application is a continuation of U.S. patent application Ser. No. 16/366,506 entitled "REMOTE OPERATION OF VEHICLES USING IMMERSIVE VIRTUAL REALITY ENVIRONMENTS", filed Mar. 27, 2019, which claims the benefit of U.S. Provisional Application No. 62/648,493 entitled "METHOD AND SYSTEM OF REMOTE OPERATION OF A VEHICLE USING AN IMMERSIVE VIRTUAL REALITY ENVIRONMENT", filed on Mar. 27, 2018. Each of these applications is incorporated herein by reference in its entirety.

BACKGROUND

As autonomous vehicles become more prevalent and rely less on direct human control, the autonomous vehicles may be required to navigate environments or situations that are unknown to them. For example, navigating around pieces of debris in the road, navigating around an accident, crossing into oncoming lanes when a lane of the autonomous vehicle is blocked, navigating through unknown environments or locations, and/or navigating other situations or scenarios may not be possible using the underlying systems of the autonomous vehicles while still maintaining a desired level of safety and/or efficacy.

Some autonomous vehicles, such as those capable of operation at autonomous driving levels 3 or 4 (as defined by the Society of Automotive Engineers (SAE) "Taxonomy and Definitions for Terms Related to Driving Automation Systems for On-Road Motor Vehicles"), include controls for a human operator. As such, conventional approaches to handling the above described situations or scenarios have included handing control back to a passenger of the vehicle. (e.g., a driver).

However, for autonomous vehicles of autonomous driving level 5, there may not be a driver, or controls for a driver, so it may not be possible to pass control to a passenger of the autonomous vehicle (or a passenger may be unfit to drive). As another example, the autonomous vehicle may not include passengers (e.g., an empty robo-taxi), or may not be large enough to hold passengers, so control of the autonomous vehicles may be completely self-contained.

Some conventional approaches have provided some level of remote control of autonomous vehicles by using a two-dimensional (2D) visualizations projected onto 2D displays, such as computer monitors or television displays. For example, the 2D display(s) at a remote operator's position may display image data (e.g., a video stream(s)) generated by a camera(s) of the autonomous vehicle to the remote operator, and the remote operator may control the autonomous vehicle using control components of a computer, such as a keyboard, mouse, joystick, and/or the like.

However, using only a 2D visualization on a 2D display(s) may not provide enough immersion or information for the remote operator to control the autonomous vehicle as safely as desired. For example, the remote operator may not gain an intuitive or natural sense of locations of other objects in the environment relative to the autonomous vehicle by looking at a 2D visualization on s 2D display(s). In addition, providing control of an autonomous vehicle from a remote location using generic computer components (e.g., keyboard, mouse, joystick, etc.) may not lend itself to natural control of the autonomous vehicle (e.g., as a steering wheel, brake, accelerator, and/or other vehicle components would). For example, a correlation (or scale) between inputs to a keyboard (e.g., a left arrow selection) and control of the autonomous vehicle (e.g., turning to the left) may not be known, such that smooth operation may not be achievable (e.g., operation that may make the passengers feel comfortable). Further, by providing only a 2D visualization, valuable information related to the state of the autonomous vehicle may not be presentable to the remote operator in an easily digestible format, such as the angle of the wheels, the current position of the steering wheel, and/or the like.

SUMMARY

Embodiments of the present disclosure relate to remote control of autonomous vehicles. More specifically, systems and methods are disclosed that relate to transferring at least partial control of the autonomous vehicle and/or another object to a remote control system to allow the remote control system to aid the autonomous vehicle and/or other object in navigating an environment.

In contrast to conventional systems, such as those described above, the systems of the present disclosure leverage virtual reality (VR) technology to generate an immersive virtual environment for display to a remote operator. For example, a remote operator (e.g., a human, a robot, etc.) may have at least partial control of the vehicle or other object (e.g., a robot, an unmanned aerial vehicle (UAV), etc.), and may provide controls for the vehicle or other object using a remote control system. Sensor data from the vehicle or other object may be sent from the vehicle or the other object to the remote control system, and the remote control system may generate and render a virtual environment for display using a VR system (e.g., on a display of a VR headset). The remote operator (e.g., a human, a robot, etc.) may provide controls to a control component(s) of the remote control system to control a virtual representation of the vehicle or other object in the virtual environment. The controls from the remote control system may then be sent (e.g., after encoding, scaling, etc.) to the vehicle or other object, and the vehicle or other object may execute controls that are based on the controls from the remote control system.

As a result, a vehicle or other object that may have previously been unable to navigate certain environments, situations, or scenarios (e.g., due to restrictions, rules, etc.), may be controlled, at least partially, through the environments, situations, or scenarios based on controls from the remote operator. Thus, instead of coming to a stop or shutting down, the vehicle or other object may be able to navigate the situation and then continue according a planned path (e.g., by reentering an autonomous mode). By navigating the situation rather than stopping or shutting down, the vehicle or other object is able to minimize the impact with respect to the scheduled travel of the ego-car and to other vehicles or objects in the environment and/or can avoid creating an unsafe situation (e.g., by stopping or shutting down on a roadway or in another environment), thereby increasing safety within the environment as well. In addition, because the controls of the remote control system may translate more seamlessly to the vehicle controls (e.g., because the remote control system may include a steering wheel, a brake, and an accelerator), and due to the immersive nature of the virtual environment, the remote operator may be able to navigate the vehicle or other object through the environment more safely and efficiently than conventional systems.

BRIEF DESCRIPTION OF THE DRAWINGS

The present systems and methods for remote control of autonomous vehicles is described in detail below with reference to the attached drawing figures, wherein.

DETAILED DESCRIPTION

Figure 1A:
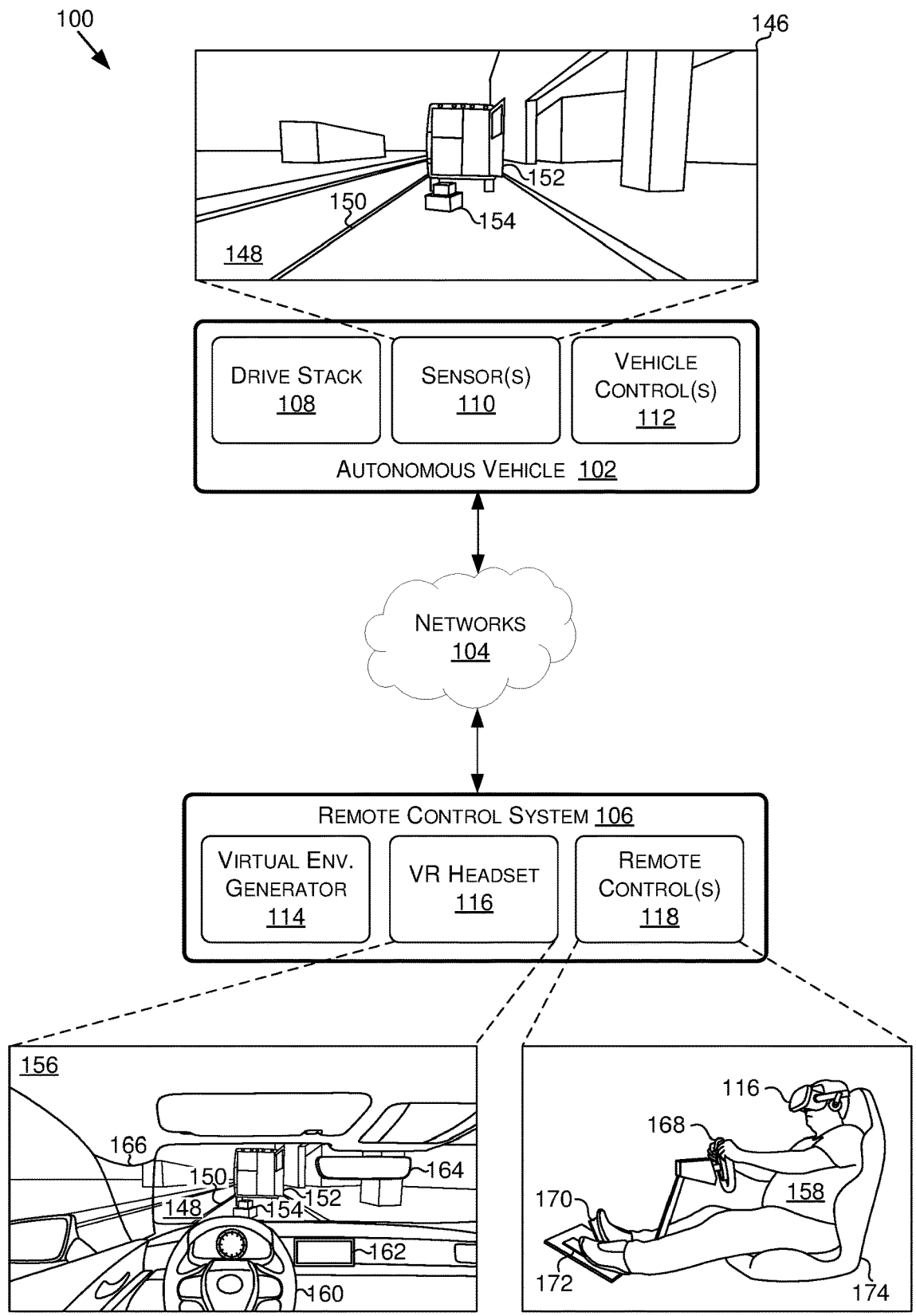
FIG. 1A is an illustration of a system for remote control of an autonomous vehicle, in accordance with some embodiments of the present disclosure.

Systems and methods are disclosed related to remote control of autonomous vehicles. The present disclosure may be described with respect to an example autonomous vehicle 102 (alternatively referred to herein as "vehicle 102" or "autonomous vehicle 102"), an example of which is described in more detail herein with respect to FIGS. 7A-7D. However, this is not intended to be limiting. For example, and without departing from the scope of the present disclosure, the systems, methods, and/or processes described herein may be applicable to non-autonomous vehicles, robots, unmanned aerial vehicles, and/or any other type of vehicle or object configured for remote control in addition to, or alternatively from, the autonomous vehicle 102. In addition, although the present disclosure may be described with respect to an autonomous vehicle control system 100, this is not intended to be limiting, and the methods and processes described herein may be implemented on systems including additional or alternative structures, components, and/or architectures without departing from the scope of the present disclosure.

Conventional systems that aim to provide some level of control of an autonomous vehicle and/or other object from a remote location may do so using an entirely two-dimensional (2D) visualization presented on a 2D display, such as a computer monitor a television display. For example, one or more computer monitors may be used to display a video streamed from a camera of a vehicle, and a remote operator may control the vehicle using a keyboard, mouse, joystick, or other generic computer components. However, using a 2D visualization on non-immersive 2D display(s) (e.g., computer monitors, television displays, etc.) may not provide enough immersion or information for the remote operator to control the vehicle or other object as safely as desired. For example, the remote operator may not gain a strong sense of locations of other objects in the environment relative to the vehicle or other object by looking at a 2D visualizations displayed on 2D displays. In addition, providing control of a vehicle from a remote location using generic computer components (e.g., keyboard, mouse, joystick, etc.) may not lend itself to natural control of a vehicle (e.g., as a steering wheel, brake, accelerator, and/or other vehicle components would). For example, a correlation (or scale) between inputs to a keyboard (e.g., a left arrow selection) and control of the vehicle (e.g., turning to the left) may not be known, such that smooth operation (e.g., operation that may make the passengers feel comfortable) may not be achievable. Further, by providing only 2D visualizations, valuable information related to the state of the vehicle may not be presentable to the user in an easily digestible format, such as the angle of the wheels, the current position of the steering wheel, and/or the like.

In contrast to conventional systems, the present system may leverage virtual reality (VR) technology to generate an immersive virtual environment for display to a remote operator using a VR system (e.g., displaying the immersive virtual environment on a VR headset, or a display thereof, of the VR system). In some examples, a remote operator may be transferred at least partial control of the vehicle or other object in response to a determination (e.g., by the autonomous vehicle or other object) that the vehicle or object cannot or should not (e.g., based on rules, conditions, constraints, etc.) navigate a situation or environment (e.g., debris blocking a safe path, rules of the road prevent the vehicle from proceeding a certain way, a dangerous condition has presented itself, such as a fallen tree or power line, etc.).

Sensor data (e.g., from cameras, LIDAR sensors, RADAR sensors, microphones, etc.) representative of fields of view of the sensors of the vehicle or object may be generated and transmitted to a control system (e.g., the system used by the remote operator). In some examples, at least some of the sensor data (e.g., image data), prior to transmission, may be encoded into a format (e.g., H.264, H.265, AV1, VP9, etc.) that is less data intensive than the format of the sensor data at generation (e.g., raw sensor data). This may have the benefit of minimizing network requirements in order to efficiently transmit the data in real-time. In some examples, the vehicle or object may include multiple modems and/or be capable of communicating across multiple network types (e.g., for redundancy), in order to ensure consistent operation.

In addition to the sensor data, vehicle state data (e.g., wheel angle, steering wheel angle, location, gear (PRND), tire pressure, etc.) representative of a state of the vehicle and/or calibration data (e.g., steering sensitivity, braking sensitivity, acceleration sensitivity, etc.) may be transmitted to the control system. The control system may use the sensor data, the vehicle state data, and/or the calibration data to generate a virtual environment and/or to calibrate the control components of the control system (e.g., a steering component, a braking component, an acceleration component, etc.). With respect to the control components, the control system may calibrate the control components to correspond to the control components of the vehicle. For example, the steering component (e.g., a steering wheel) may be calibrated to the sensitivity of the steering wheel of the vehicle and/or the starting rotation of the steering wheel may be calibrated to correspond to the rotation of the steering wheel of the vehicle. Similarly, the braking and acceleration components may be calibrated.

In some examples, such as where the vehicle is of a different scale than the scale of the virtual vehicle, or has different control mechanisms, the control components of the control system may be calibrated (e.g., scaled) to match that of the vehicle. For example, where the vehicle is one-fifth scale (e.g., one-fifth scale with respect to the remote control components), the control inputs to the control components of the control system may be downscaled to correlate to the scale of the vehicle.

The virtual environment may be generated in a variety of ways. In any examples, the virtual environment may include a display of video streams from one or more of the cameras of the vehicle. In some examples, the display may be on display screens (e.g., virtual display screens) within the virtual environment (e.g., NVIDIA's HOLODECK), while in other examples, the display may be from a vantage point or perspective within a cockpit of a virtual vehicle (e.g., creating an immersive view of the surrounding environment of the vehicle from within the virtual vehicle) to simulate a real-world view when sitting in the vehicle in the physical environment. In any example, the field of view of the remote operator may be from any vantage point or perspective (e.g., outside of the vehicle, beside the vehicle, above the vehicle, within the vehicle, etc.).

Using the cockpit example, the field of view may be more consistent with what a driver would see in a driver's seat of the vehicle. In such an example, at least some of the structure of the vehicle may be removed from the rendering, or presented at least partially transparent or translucent (e.g., portions of the vehicle that occlude the field of view out of the vehicle), while other components not normally visible to a driver may be included (e.g., the wheels at their current angle in the environment). Vehicle data may be used to generate a virtual simulation of the vehicle, or of another vehicle, that may include a virtual instrument panel, dashboard, HMI display, controls (e.g., blinkers, etc.), and/or other features and functionality of a vehicle (e.g., if the vehicle is of Make X and model Y, the virtual environment may include a virtual representation of the vehicle of Make X and Model Y).

The remote operator may use a view of the virtual environment and/or the control components of the control system to control the vehicle in the physical environment. For example, the remote operator may steer, accelerate, and/or brake using the control system, the controls may be transmitted to the vehicle, and the vehicle may use the controls to execute one or more actuations using actuation component(s) of the vehicle. In some examples, the controls input by the remote operator may be used by the vehicle one-to-one, while in other examples, the controls may be used as suggestions (or high level control commands). For example, a user may provide steering inputs, braking inputs, and/or acceleration inputs, and a control unit in the vehicle may analyze the controls to determine how to most effectively execute them. As another example, the user may provide waypoints for the vehicle (e.g., indicate points in the virtual environment that the virtual vehicle should navigate to, and the virtual points may be transmitted to real-world points for the vehicle to navigate to). In any example, the vehicle may maintain control at an obstacle avoidance level, such that any controls from the control system may not be executed (or may be altered) if the vehicle determines that a collision may result. In such examples, the vehicle may implement a safety procedure—such as, without limitation, coming to a complete stop—when a collision is determined to be likely or imminent.

In some examples, the transmission of data between the vehicle and the control system may be via one or more networks, such as cellular networks (e.g., 5G), Wi-Fi, and/or other network types. When possible, the vehicle may transmit all sensor data used by the control system to generate the virtual environment and/or calibrate the control components. However, in situations where the network connection strength is low (e.g., below a threshold), or to otherwise limit bandwidth usage, the vehicle may send only the minimum data required to enable safe and effective operation of the vehicle. For example, the sensors that are to continue to transmit data to the control system may be determined based on an orientation of a virtual reality headset worn by the remote operator. In such examples, the sensors having fields of view that correspond to the virtual field of view of the remote operator based on the current orientation may be sent (or data corresponding to portions of the fields of view thereof). For example, if a remote operator is looking forward, at least some of the sensor data from the sensors with fields of view to the rear of the vehicle may not be transmitted. Similarly, if the remote operator looks toward the virtual rear-view mirror in the virtual environment (e.g., as based on eye gaze or eye tracking information), at least some of the sensor data from the sensors to the rear of the vehicle (e.g., that are used to render a view on the virtual rear-view mirror) may be transmitted, while at least some sensor data from sensors with fields of view to the side and/or front of the vehicle may not.

In some examples, the controls implemented by the remote operator and/or the corresponding sensor data may be applied to machine learning model(s) to train the machine learning models on how to navigate unknown or uncertain situations or scenarios represented by the sensor data. For example, if a vehicle was operating in a previously unexplored location, and experienced a situation that has not yet been experienced (e.g., due to the unique environment), the remote operator may take over control of the vehicle and control the vehicle through the situation. The sensor data and/or the controls from the navigating through the situation may then be used to train a neural network (e.g., for use in automatically controlling the vehicle in similar future situations).

Figure 1B:
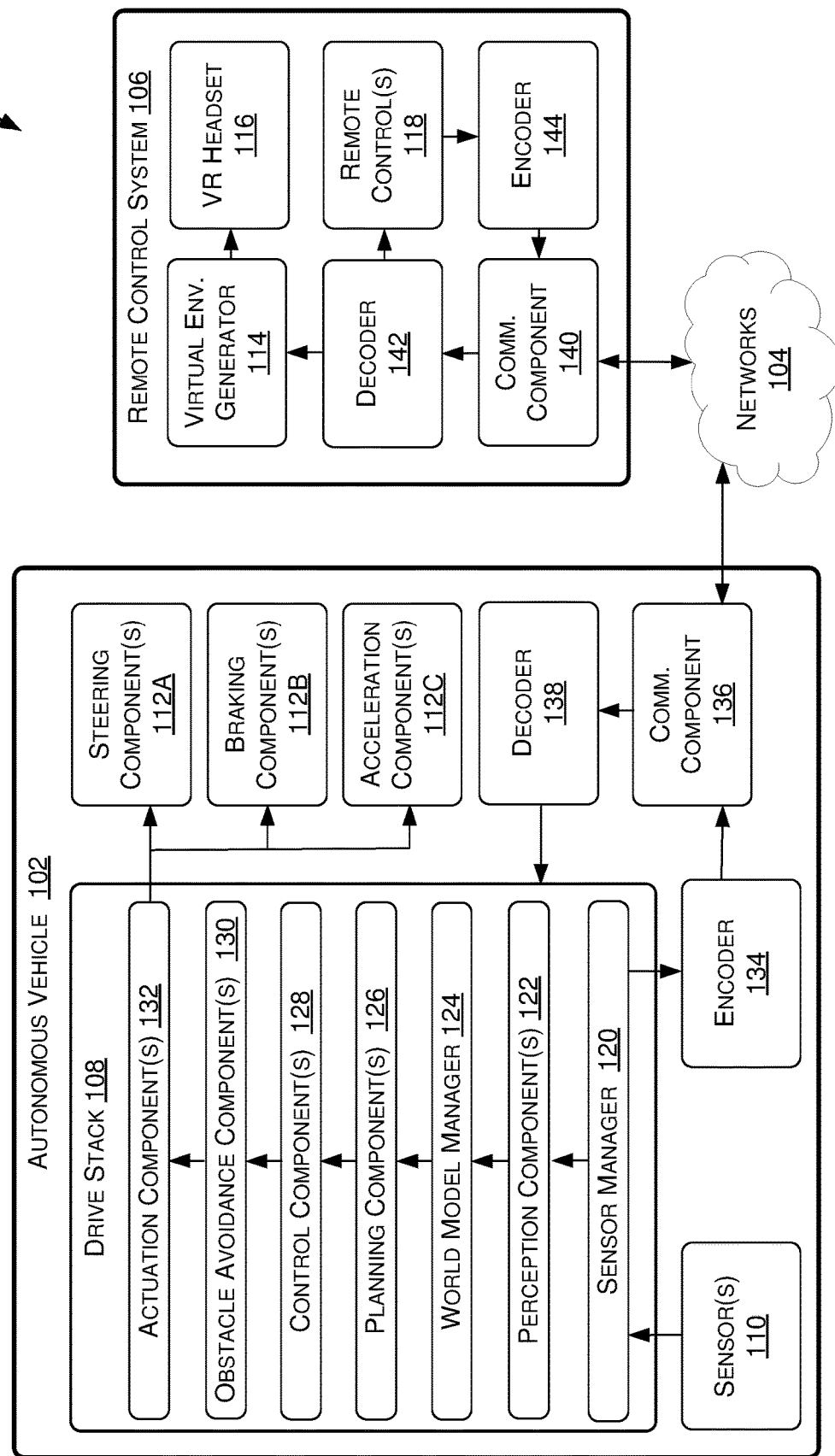
FIG. 1B is another illustration of a system for remote control of an autonomous vehicle, in accordance with some embodiments of the present disclosure.

With reference to FIGS. 1A-1B, FIGS. 1A-1B are block diagrams of an example autonomous vehicle control system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The illustration of FIG. 1A may represent a more generalized illustration of the autonomous vehicle control system 100 as compared to the illustration of FIG. 1B. The components, features, and/or functionality of the autonomous vehicle 102 described with respect to FIGS. 1A-1B may be implemented using the features, components, and/or functionality described in more detail herein with respect to FIGS. 7A-7D. In addition, as described herein, the components, features, and/or functionality of the autonomous vehicle 102 and/or remote control system 106 described with respect to FIGS. 1A-1B may be implemented using the features, components, and/or functionality described in more detail herein with respect to example computing device 800 of FIG. 8.

The autonomous vehicle control system 100 may include an autonomous vehicle 102, one or more networks 104, and a remote control system 106. The autonomous vehicle 102 may include a drive stack 108, sensors 110, and/or vehicle controls 112. The drive stack 108 may represent an autonomous driving software stack, as described in more detail herein with respect to FIG. 1B. The sensor(s) 110 may include any number of sensors of the vehicle 102, including, with reference to FIGS. 7A-7D, global navigation satellite system (GNSS) sensor(s) 758, RADAR sensor(s) 760, ultrasonic sensor(s) 762, LIDAR sensor(s) 764, inertial measurement unit (IMU) sensor(s) 766, microphone(s) 796, stereo camera(s) 768, wide-view camera(s) 770, infrared camera(s) 772, surround camera(s) 774, long range and/or mid-range camera(s) 798, and/or other sensor types. The sensor(s) 110 may generate sensor data (e.g., image data) representing a field(s) of view of the sensor(s) 110.

For example, the sensor data may represent a field of view of each of a number of cameras of the vehicle 102. In some examples, the sensor data may be generated from any number of cameras that may provide a representation of substantially 360 degrees around the vehicle 102 (e.g., fields of view that extend substantially parallel to a ground plane). In such an example, the fields of view may include a left side of the vehicle 102, a rear of the vehicle 102, a front of the vehicle 102, and/or a side of the vehicle 102. The sensor data may further be generated to include fields of view above and/or below the vehicle 102 (e.g., of the ground or driving surface around the vehicle 102 and/or of the space above the vehicle 102). In some examples, the sensor data may be generated to include blind spots of the vehicle 102 (e.g., using wing-mirror mounted camera(s)). As another example, the sensor data may be generated from some or all of the camera(s) illustrated in FIG. 7B. As such, the sensor data generated by the vehicle 102 may include sensor data from any number of sensors without departing from the scope of the present disclosure.

With reference to FIG. 1A, an image 146 may include a representation of sensor data (e.g., image data) generated from a front-facing camera of the vehicle 102. The image 146 may include a two-way, solid-line 150 divided street 148, such that the vehicle 102, when following the rules of the road, may not be allowed to cross the solid-line 150 to pass a vehicle or object in the lane of the vehicle 102. In the image 146, a van 152 may be stopped in the lane of the vehicle 102 to unload boxes 154, so the vehicle 102 may have come to a stop a safe distance behind the van 152. By following the constraints of the vehicle 102 (e.g., due to the rules of the road), the vehicle 102 may, without the features and functionality of the present disclosure, remain stopped behind the van 152 until the van 152 moves (or may pass control to a human operator, depending on the embodiment). However, in the current autonomous vehicle control system 100, the vehicle 102 may determine, in response to encountering the situation represented in the image 146, to transfer at least partial control to the remote control system 106. In other examples, the determination to transfer the control of the vehicle 102 (e.g., to initiate a remote control session) may be made by the remote operator (or otherwise may be made at the remote control system 106); by a passenger of the vehicle 102 (e.g., using a command or signal, such as a voice command, an input to a user interface element, a selection of a physical button, etc.); and/or by another actor. For example, sensor data may be analyzed at the remote control system 106 (and/or by another system remote from the vehicle 102) and may be used to determine whether a remote control session should be initiated.

Although the situation represented in FIG. 1A includes a van 152 blocking the lane of the vehicle 102, this is not intended to be limiting. For example, any number of situations, scenarios, and/or environments, including but not limited to those described herein, may lead to a determination by the vehicle 102 to transfer at least partial control to the remote control system 106 without departing from the scope of the present disclosure. In other examples, the determination may be made by the remote control system 106 to take over control of the vehicle 102. In any examples, proper consent may be obtained from the owner and/or operator of the vehicle 102 in order to enable takeover by the remote operator of the remote control system 106.

In addition to the image 146, the vehicle 102 may also capture additional sensor data from additional sensors 110 of the vehicle 102, such as from a side-view camera(s), a rear-view camera(s), a surround camera(s), a wing-mirror mounted camera(s), a roof-mounted camera(s), parking camera(s) (e.g., with a field(s) of view of the ground surface around the vehicle 102), LIDAR sensor(s), RADAR sensor(s), microphone(s), etc. The sensor data generated by the sensor(s) 110 may be transmitted over the network(s) 104 to the remote control system 106. In some examples, the sensor(s) 110 may generate the sensor data in a first format (e.g., a raw format) that may be of a first data size. In order to minimize bandwidth requirements, the sensor data may be encoded in a second format that may be of a second data size less than the first data size (e.g., to decrease the amount of data being sent over the network(s) 104).

In addition to the sensor data that may be used to generate a representation of the environment of the vehicle 102, vehicle state data (e.g., representative of the state of the vehicle 102) and/or calibration data (e.g., for calibrating the remote control(s) 118 according to the vehicle control(s) 112) may also be transmitted over the network(s) 104 to the remote control system 106. For example, the vehicle state data and/or the calibration data may be determined using one or more sensors 110 of the vehicle 102, such as the steering sensor(s) 740, speed sensor(s) 744, brake sensor(s), IMU sensor(s) 766, GNSS sensor(s) 758, and/or other sensors 110. The vehicle state data may include wheel angles, steering wheel angle, location, gear (e.g., Park, Reverse, Neutral, Drive (PRND)), tire pressure, speed, velocity, orientation, etc. The calibration data may include steering sensitivity, braking sensitivity, acceleration sensitivity, etc. In some examples, the calibration data may be determined based on a make, model, or type of the vehicle 102. This information may be encoded in the calibration data by the vehicle 102 and/or may be determined by the remote control system 106, such as by accessing one or more data stores (e.g., after determining identification information for the vehicle 102).

The sensor data, the vehicle state data, and/or the calibration data may be received by the remote control system 106 over the network(s) 104. The network(s) 104 may include one or more network types, such as cellular networks (e.g., 5G, 4G, LTE, etc.), Wi-Fi networks (e.g., where accessible), low power wide-area networks (LPWANs) (e.g., LoRaWAN, SigFox, etc.), and/or other network types. In some examples, the vehicle 102 may include one or more modems and/or one or more antennas for redundancy and/or for communicating over different network types depending on network availability.

The remote control system 106 may include a virtual environment generator 114, a VR headset 116, and a remote control(s) 118. The virtual environment generator 114 may use the sensor data, the vehicle state data, and/or the calibration data to generate a virtual environment that may represent the environment (e.g., the real-world or physical environment, such as the ground surface, the vehicles, the people or animals, the buildings, the objects, etc.) in the field(s) of view of the sensor(s) 110 of the vehicle 102 (e.g., the camera(s), the LIDAR sensor(s), the RADAR sensor(s), etc.), as well as represent at least a portion of the vehicle 102 (e.g., an interior, an exterior, components, features, displays, instrument panels, etc.) and/or controls of the vehicle 102 (e.g., a virtual steering wheel, a virtual brake pedal, a virtual gas pedal, a virtual blinker, a virtual HMI display, etc.). In some examples, the virtual environment may include virtual representations of portions of the vehicle 102 that may not be visible to a driver or passenger of the vehicle 102 in the real-world environment, such as the wheels at an angle (e.g., corresponding to the angle of the wheels of the vehicle 102 in the real-world environment as determined by the vehicle state data and/or the calibration data), which may be viewable from within a virtual cockpit of the virtual vehicle by making one or more other components of the virtual vehicle fully transparent, semi-transparent (e.g., translucent), or removed from the rendering altogether.

Figure 2A:
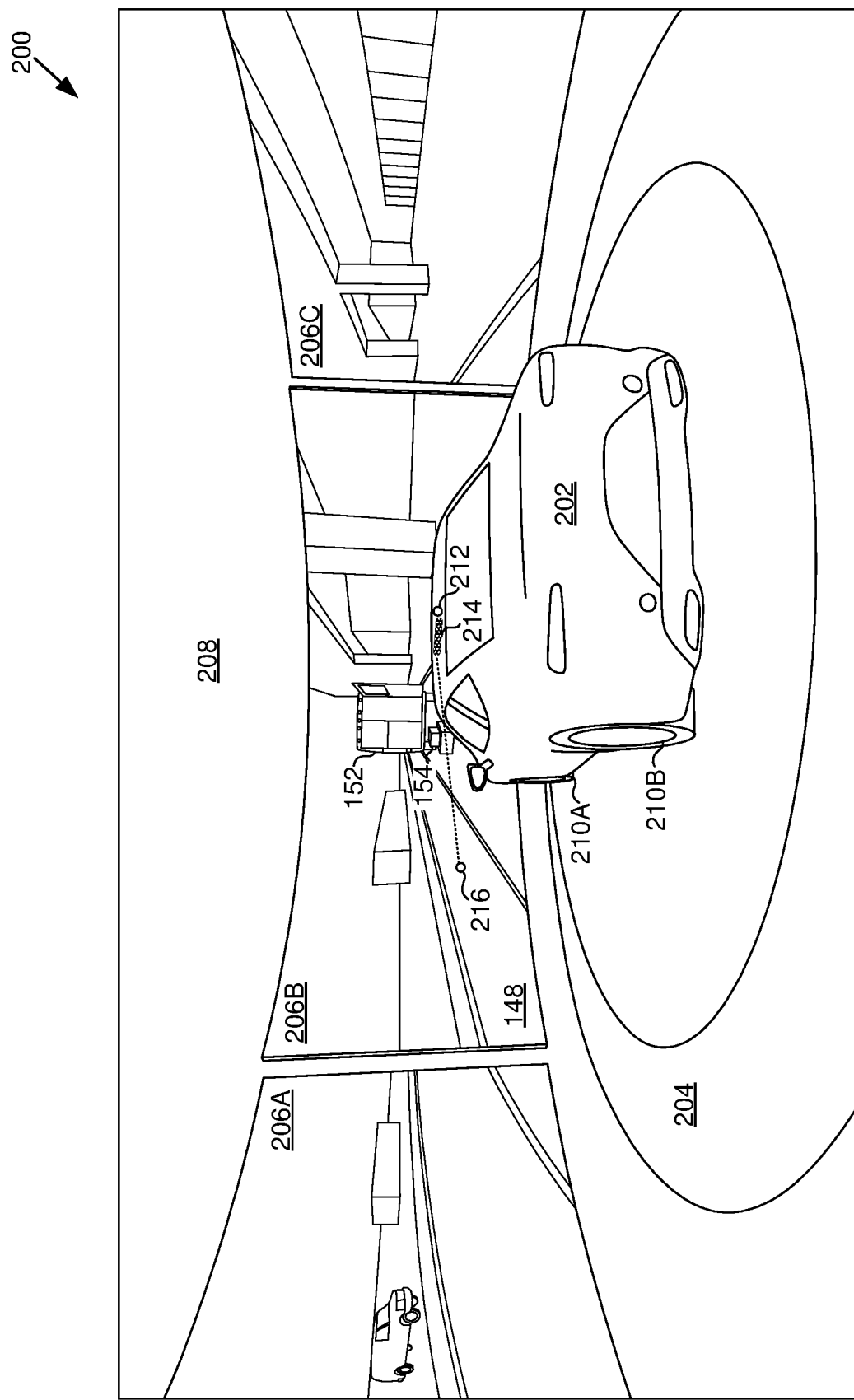
FIG. 2A is an illustration of an example virtual environment, in accordance with some embodiments of the present disclosure.
Figure 2B:
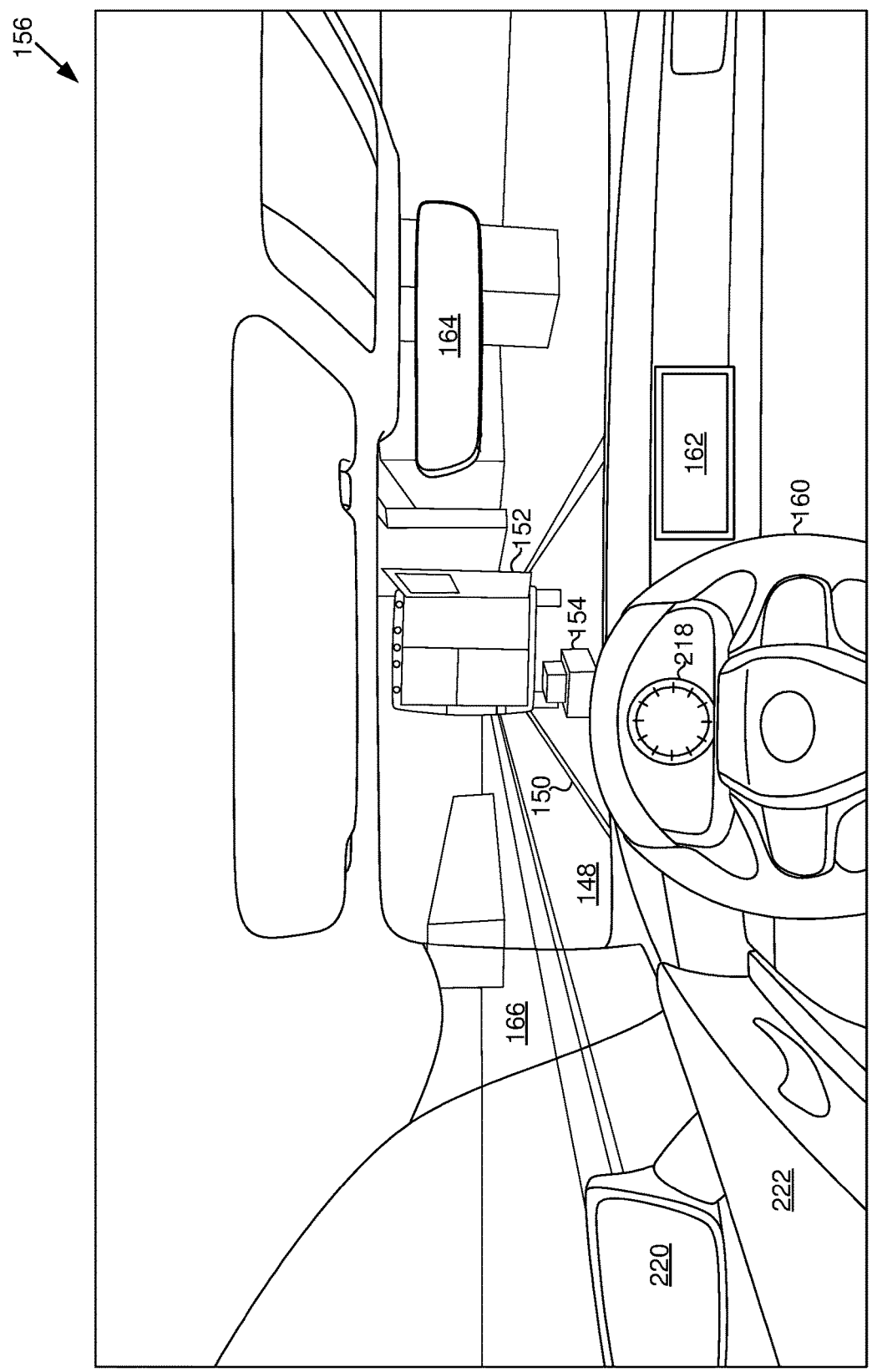
FIG. 2B is another illustration of an example virtual environment, in accordance with some embodiments of the present disclosure.

The virtual environment may be generated from any number of vantage points of a remote operator. As non-limiting examples, the virtual environment may be generated from a vantage point within a driver's seat of the virtual vehicle (e.g., as illustrated in FIG. 2B); from within another location within the virtual vehicle; and from a position outside of the virtual vehicle (e.g., as illustrated in FIG. 2A), such as on top of the virtual vehicle, to the side of the virtual vehicle, behind the virtual vehicle, above the virtual vehicle, etc. In some examples, the remote operator may be able to select from any number of different vantage points and/or may be able to transition between different vantage points, even in the same remote control session. For example, the remote operator may start a remote control session from a first vantage point inside the cockpit of the virtual vehicle (e.g., in the driver's seat), and then, when navigating through a tight space or around an obstacle, may transition to a second vantage point outside of the virtual vehicle where the relationship between the tight space or the obstacle and the virtual vehicle may be more clearly visualized. In any example, the desired vantage point of the remote operator may be selectable within the remote control system. The remote operator may be able to set defaults or preferences with respect to vantage points.

The remote operator may be able to set defaults and/or preferences with respect to other information in the virtual environment, such as the representations of information that the remote operator would like to have available within the virtual environment, or more specifically with respect to the virtual vehicle in the virtual environment (e.g., the remote operator may select which features of the instrument panel should be populated, what should be displayed on a virtual HMI display, which portions of the vehicle should be transparent and/or removed, what color the virtual vehicle should be, what color the interior should be, etc.). As such, the remote operator may be able to generate a custom version of the virtual vehicle within the virtual environment. In any example, even where the virtual vehicle is not the same year, make, model, and/or type as the vehicle 102 in the real-world environment, the virtual vehicle may be scaled to occupy a substantially similar amount of space in the virtual environment as the vehicle 102 in the real-world environment. As such, even when the virtual vehicle is of a different size or shape as the vehicle 102, the representation of the virtual vehicle may provide a more direct visualization to the remote operator of the amount of space the vehicle 102 occupies in the real-world environment.

In other examples, the virtual vehicle may be generated according to the year, make, model, type, and/or other information of the vehicle 102 in the real-world environment (e.g., if the vehicle 102 is a Year N (e.g. 2019), Make X, and Model Y, the virtual vehicle may represent a vehicle with the dimensions, and steering/driving profiles consistent with a Year N, Make X, Model Y vehicle). In such examples, the remote operator may still be able to customize the virtual vehicle, such as by removing or making transparent certain features, changing a color, changing an interior design, etc., but, in some examples, may not be able to customize the general shape or size of the vehicle.

The virtual environment (e.g., virtual environment 156) may be rendered and displayed on a display of the VR headset 116 of the remote operator (e.g., remote operator 158). The virtual environment 156 may represent a virtual vehicle—that may correspond to the vehicle 102—from a vantage point of the driver's seat. The virtual environment 156 may include a representation of what a passenger of the vehicle 102 may see when sitting in the driver's seat. The camera(s) or other sensor(s) 110 may not capture the sensor data from the same perspective of a passenger or driver of the vehicle. As a result, in order to generate the virtual environment 156 (or other virtual environments where the vantage point does not directly correspond to a field(s) of view of the sensor(s)), the sensor data may be manipulated. For example, the sensor data may be distorted or warped, prior to displaying the rendering on the display of the VR headset 116. In some examples, distorting or warping the sensor data may include performing a fisheye reduction technique on one more of the sensor data feeds (e.g., video feeds from one or more camera(s)). In other examples, distorting or warping the sensor data may include executing a positional warp technique to adjust a vantage point of a sensor data feed to a desired vantage point. In such an example, such as where a camera(s) is roof-mounted on the vehicle 102, a positional warp technique may be used to adjust, or bring down, the image data feed from roof-level of the camera(s) to eye-level of a virtual driver of the virtual vehicle (e.g., the remote operator).

In examples, the sensor data may be manipulated in order to blend or stitch sensor data corresponding to different fields of view of different sensors. For example, two or more sensors may be used to generate the representation of the environment (e.g., a first camera with a first field of view to the front of the vehicle 102, a second camera with a second field of view to a left side of the vehicle 102, and so on). In such examples, image or video stitching techniques may be used to stitch together or combine sensor data, such as images or video, to generate a field of view (e.g., 360 degrees) for the remote operator with virtually seamless transitions between fields of view represented by the different sensor data from different sensors 110. In one or more example embodiments, the sensor data may be manipulated and presented to the remote operator in a 3D visualization (e.g., stereoscopically). For example, one or more stereo cameras 768 of the vehicle 102 may generate images, and the images may be used (e.g., using one or more neural networks, using photometric consistency, etc.) to determine depth (e.g., along a Z-axis) for portions of the real-world environment that correspond to the images. As such, the 3D visualization may be generated using the stereoscopic depth information from the stereo cameras 768. In other examples, the depth information may be generated using LIDAR sensors, RADAR sensors, and/or other sensors of the vehicle 102. In any example, the depth information may be leveraged to generate the 3D visualization for display or presentation to the remote operator within the virtual environment. In such examples, some or all of rendering or display of the virtual environment to the remote operator may include a 3D visualization.

In some examples, because the vehicle 102 may be an autonomous vehicle capable of operating at autonomous driving level 5 (e.g., fully autonomous driving), the vehicle 102 may not include a steering wheel. However, even in such examples, the virtual vehicle may include the steering wheel 160 (e.g., in a position relative to a driver's seat, if the vehicle 102 had a driver's seat) in order to provide the remote operator 158 a natural point of reference for controlling the virtual vehicle. In addition to the steering wheel 160, the interior of the virtual vehicle may include a rear-view mirror 164 (which may be rendered to display image data representative of a field(s) of view of a rear-facing camera(s)), wing mirrors (which may be rendered to display image data representative of field(s) of view of side-view camera(s), wing-mounted camera(s), etc.), a virtual HMI display 162, door handles, doors, a roof, a sunroof, seats, consoles, and/or other portions of the virtual vehicle (e.g., based on default settings, based on preferences of the remote operator, and/or preferences of another user(s) of the remote control system 106, etc.).

As described herein, at least some of the portions of the virtual vehicle may be made at least partially transparent and/or be removed from the virtual environment. An example is support column 166 of the vehicle chassis being at least partially transparent and/or removed from the virtual vehicle, such that objects and the surface in the virtual environment are not occluded or at least less occluded by the support column 166. Examples of the virtual environment 156 are described in more detail herein with respect to FIG. 2B.

The instance of the virtual environment 156 in FIG. 1A (and correspondingly, FIG. 2B) may represent a time that the image 146 was captured by the vehicle 102, and thus may include, as viewed through a windshield of the virtual vehicle, virtual representations of the van 152, the boxes 154, the street 148, and the solid-line 150. In some examples, such as in the virtual environment 156, each of the virtual objects in the virtual environment may be rendered relative to the virtual vehicle to correspond to the relative location of the objects in the real-world environment with respect to the vehicle 102 (e.g., using depth information from the sensor data). The virtual representations of the image data may include the images or video from the image data, rendered within the virtual environment. As described herein, the virtual environment may be rendered from any of a number of different vantage points (including those illustrated in FIGS. 2A-2B), and the virtual environment 156 is only one, non-limiting example of a virtual environment.

The remote operator 158 may use the remote control(s) 118 to control the virtual vehicle in the virtual environment. The remote control(s) 118 may include a steering wheel 168 (or other control(s) for providing steering inputs, such as keyboards, joysticks, handheld controllers, etc.), an acceleration component 170 (which may be a physical pedal as illustrated in FIG. 1A, or may be a keyboard, a joystick, a handheld controller, a button, etc.), a braking component 172 (which may be a physical pedal as illustrated in FIG. 1A, or may be a keyboard, a joystick, a handheld controller, a button, etc.), and/or other control components, such as blinker actuators (which may be physical levers, or may be controlled using a keyboard, a joystick, a handheld controller, voice, etc.), a horn, light actuators (such as a button, lever, or knob for turning on and off lights, including driving lights, fog lights, high-beams, etc.), etc.

In some examples, the remote control(s) may include pointers (e.g., controllers or other objects) that may be used to indicate or identify a location in the environment that the virtual vehicle should navigate to. In such examples, the remote control(s) 118 may be used to provide input to the vehicle 102 as to where in the real-world environment the vehicle 102 should navigate, and the vehicle 102 may use this information to generate controls for navigating to the location. For example, with respect to the image 146, the remote operator 158 may point to a location in the lane to the left of the vehicle 102 and the van 152, such that the vehicle 102 is able to use the information to override the rules of the road that have stopped the vehicle from passing the van 152, and to proceed to the adjacent lane in order to pass the van 152 and the boxes 154. More detail is provided herein for control input types with respect to FIG. 1B.

In any example, the remote operator 158 may control the virtual vehicle through the virtual environment 156, and the control inputs to the remote control(s) 118 may be captured. Control data representative of each of the control inputs (e.g., as they are received by the remote control system 106) may be transmitted to the vehicle 102 over the network(s) 104. In some examples, as described in more detail herein, the control data may be encoded by the remote control system 106 prior to transmission and/or may be encoded upon receipt by the vehicle 102. The encoding may be to convert the control data from the remote control system 106 to vehicle control data suitable for use by the vehicle 102. The control data may be scaled, undergo a format change, and/or other encoding may be executed to convert the control data to vehicle control data that the vehicle 102 understands and can execute. As a result, as the remote operator 158 controls the virtual vehicle through the virtual environment, the vehicle 102 may be controlled through the real-world environment accordingly. With respect to the image 146 and the virtual environment 156, the remote operator 158 may control the virtual vehicle to navigate around the virtual representation of the van 152 by entering the adjacent lane of the street 148 to the left of the van 152, passing the van 152, and then reentering the original lane. Responsive to the input controls from the remote operator 158, the vehicle 102 may, at substantially the same time, navigate around the van 152 by entering the adjacent lane of the street 148 in the real-world environment, proceeding past the van 152, and then reentering the original lane of the street 148.

In some examples, such as depending on the preferences of the owner and/or operator of the vehicle 102, a remote control session may be substantially seamless to any passengers of the vehicle 102, such that the passengers may not be made aware or notice the transfer of control to the remote control system 106 and then back to the vehicle 102. In other examples, further depending on the preferences of the owner and/or operator, the passengers of the vehicle may be informed prior to and/or during the time when the control is passed to the remote control system 106. For example, the remote control system 106 may include a microphone(s) and/or a speaker(s) (e.g., headphones, standalone speakers, etc.), and the vehicle 102 may include a microphone(s) and/or a speaker(s), such that one-way or two-way communication may take place between the passengers and the remote operator 158. In such examples, once control is passed back to the vehicle 102, the passengers may again be made aware of the transition.

Now referring to FIG. 1B, FIG. 1B may include a more detailed illustration of the autonomous vehicle control system 100 of FIG. 1A. The autonomous vehicle 102 may include the drive stack 108, which may include a sensor manager 120, perception component(s) 122 (e.g., corresponding to a perception layer of the drive stack 108), a world model manager 124, planning component(s) 126 (e.g., corresponding to a planning layer of the drive stack 108), control component(s) 128 (e.g., corresponding to a control layer of the drive stack 108), obstacle avoidance component(s) (e.g., corresponding to an obstacle or collision avoidance layer of the drive stack 108), actuation component(s) 132 (e.g., corresponding to an actuation layer of the drive stack 108), and/or other components corresponding to additional and/or alternative layers of the drive stack 108.

The sensor manager 120 may manage and/or abstract sensor data from sensors 110 of the vehicle 102. For example, and with reference to FIG. 7C, the sensor data may be generated (e.g., perpetually, at intervals, based on certain conditions) by global navigation satellite system (GNSS) sensor(s) 758, RADAR sensor(s) 760, ultrasonic sensor(s) 762, LIDAR sensor(s) 764, inertial measurement unit (IMU) sensor(s) 766, microphone(s) 796, stereo camera(s) 768, wide-view camera(s) 770, infrared camera(s) 772, surround camera(s) 774, long range and/or mid-range camera(s) 798, and/or other sensor types.

The sensor manager 120 may receive the sensor data from the sensors in different formats (e.g., sensors of the same type, such as LIDAR sensors, may output sensor data in different formats), and may be configured to convert the different formats to a uniform format (e.g., for each sensor of the same type). As a result, other components, features, and/or functionality of the autonomous vehicle 102 may use the uniform format, thereby simplifying processing of the sensor data. In some examples, the sensor manager 120 may use a uniform format to apply control back to the sensors of the vehicle 102, such as to set frame rates or to perform video gain control. The sensor manager 120 may also update sensor packets or communications corresponding to the sensor data with timestamps to help inform processing of the sensor data by various components, features, and functionality of the autonomous vehicle control system 100.

A world model manager 124 may be used to generate, update, and/or define a world model. The world model manager 124 may use information generated by and received from the perception component(s) 122 of the drive stack 108. The perception component(s) 122 may include an obstacle perceiver, a path perceiver, a wait perceiver, a map perceiver, and/or other perception component(s) 122. For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 124 may continually update the world model based on newly generated and/or received inputs (e.g., data) from the obstacle perceiver, the path perceiver, the wait perceiver, the map perceiver, and/or other components of the autonomous vehicle control system 100.

The world model may be used to help inform planning component(s) 126, control component(s) 128, obstacle avoidance component(s) 130, and/or actuation component(s) 132 of the drive stack 108. The obstacle perceiver may perform obstacle perception that may be based on where the vehicle 102 is allowed to drive or is capable of driving, and how fast the vehicle 102 can drive without colliding with an obstacle (e.g., an object, such as a structure, entity, vehicle, etc.) that is sensed by the sensors 110 of the vehicle 102.

The path perceiver may perform path perception, such as by perceiving nominal paths that are available in a particular situation. In some examples, the path perceiver may further take into account lane changes for path perception. A lane graph may represent the path or paths available to the vehicle 102, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 102 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped busses or other vehicles, one-way bridge arbitrations, ferry entrances, etc. In some examples, the wait perceiver may be responsible for determining longitudinal constraints on the vehicle 102 that require the vehicle to wait or slow down until some condition is true. In some examples, wait conditions arise from potential obstacles, such as crossing traffic in an intersection, that may not be perceivable by direct sensing by the obstacle perceiver, for example (e.g., by using sensor data from the sensors 110, because the obstacles may be occluded from field of views of the sensors 110). As a result, the wait perceiver may provide situational awareness by resolving the danger of obstacles that are not always immediately perceivable through rules and conventions that can be perceived and/or learned. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 102 of static or stationary infrastructure objects and obstacles. The map perceiver may also generate information for the wait perceiver and/or the path perceiver, for example, such as to determine which light at an intersection has to be green for the vehicle 102 to take a particular path.

Figure 7A:
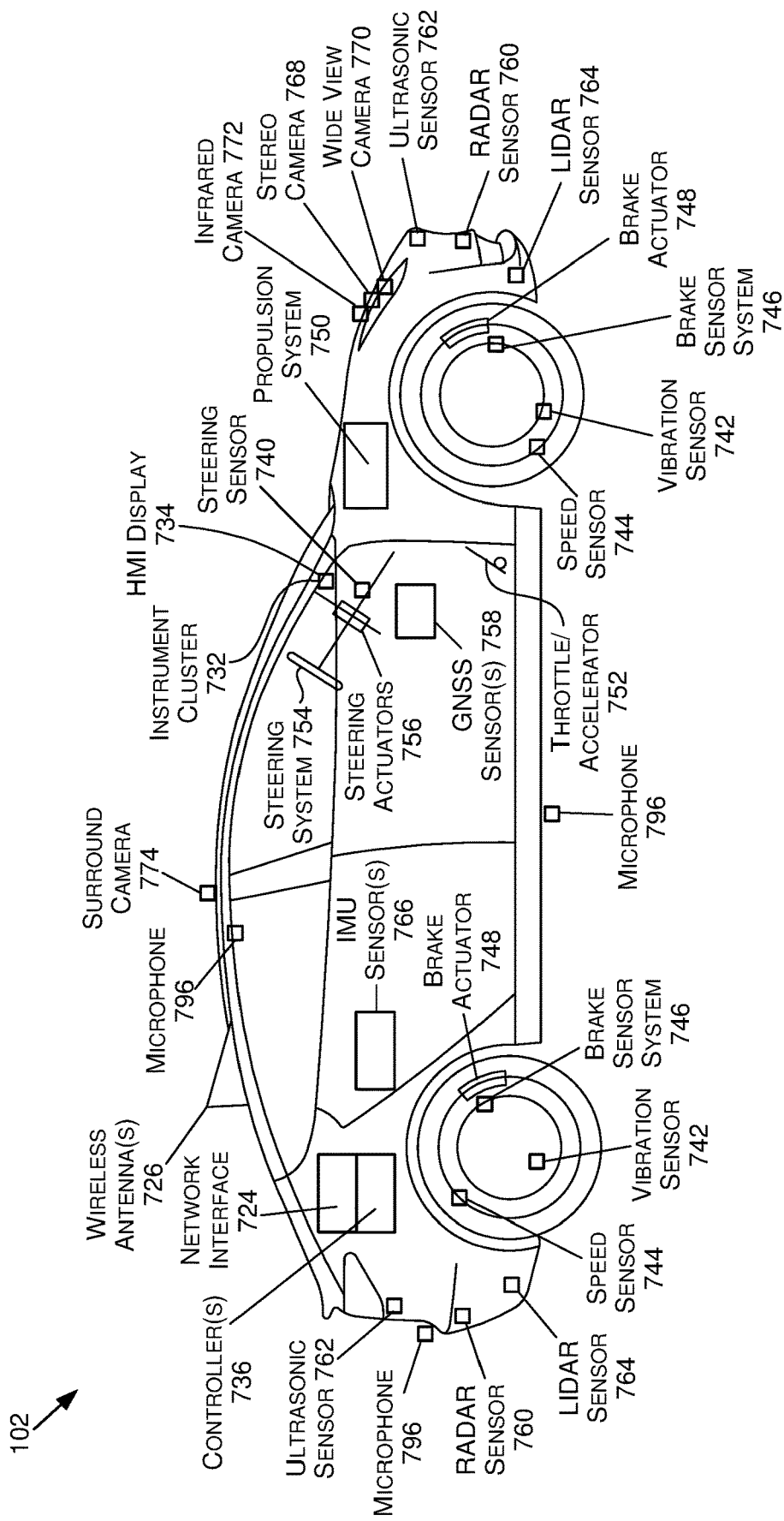
FIG. 7A is an illustration of an example autonomous vehicle, in accordance with some embodiments of the present disclosure.
Figure 7B:
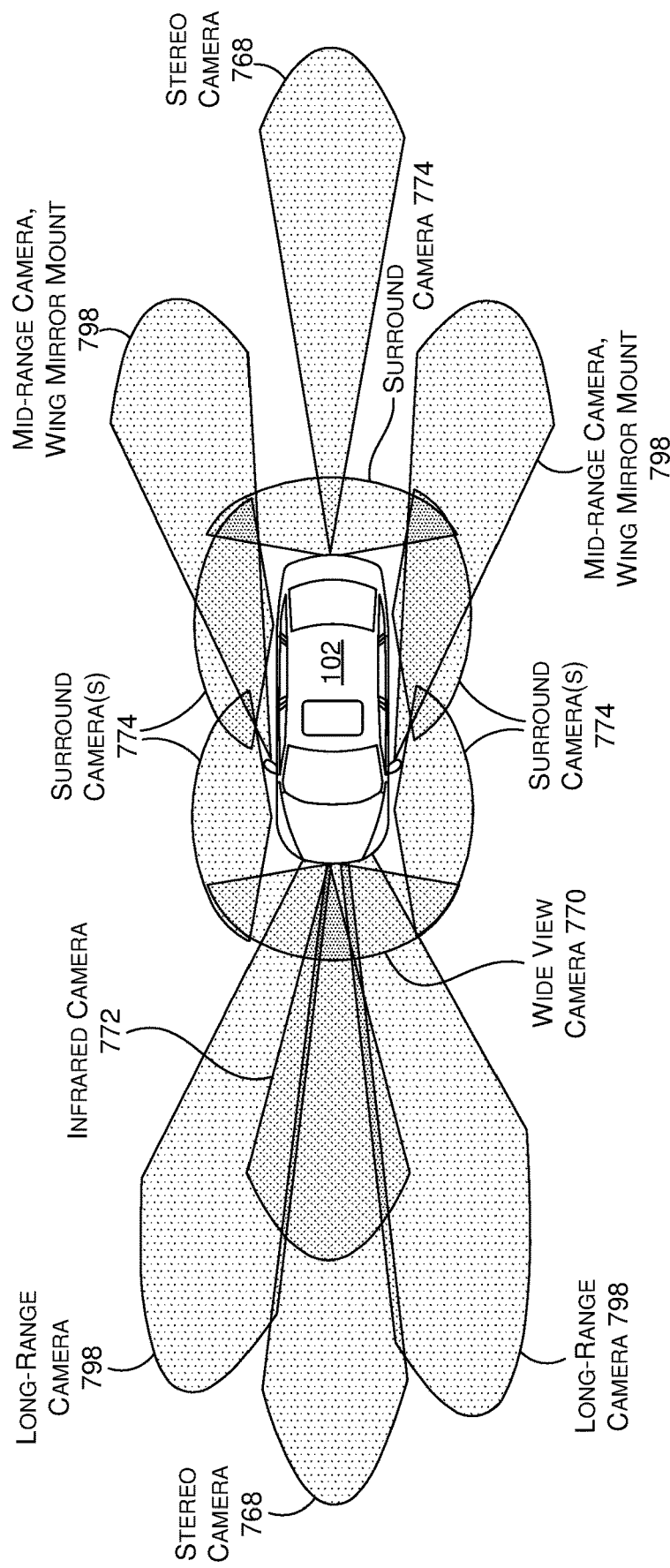
FIG. 7B is an example of camera locations and fields of view for the example autonomous vehicle of FIG. 7A, in accordance with some embodiments of the present disclosure.
Figure 7C:
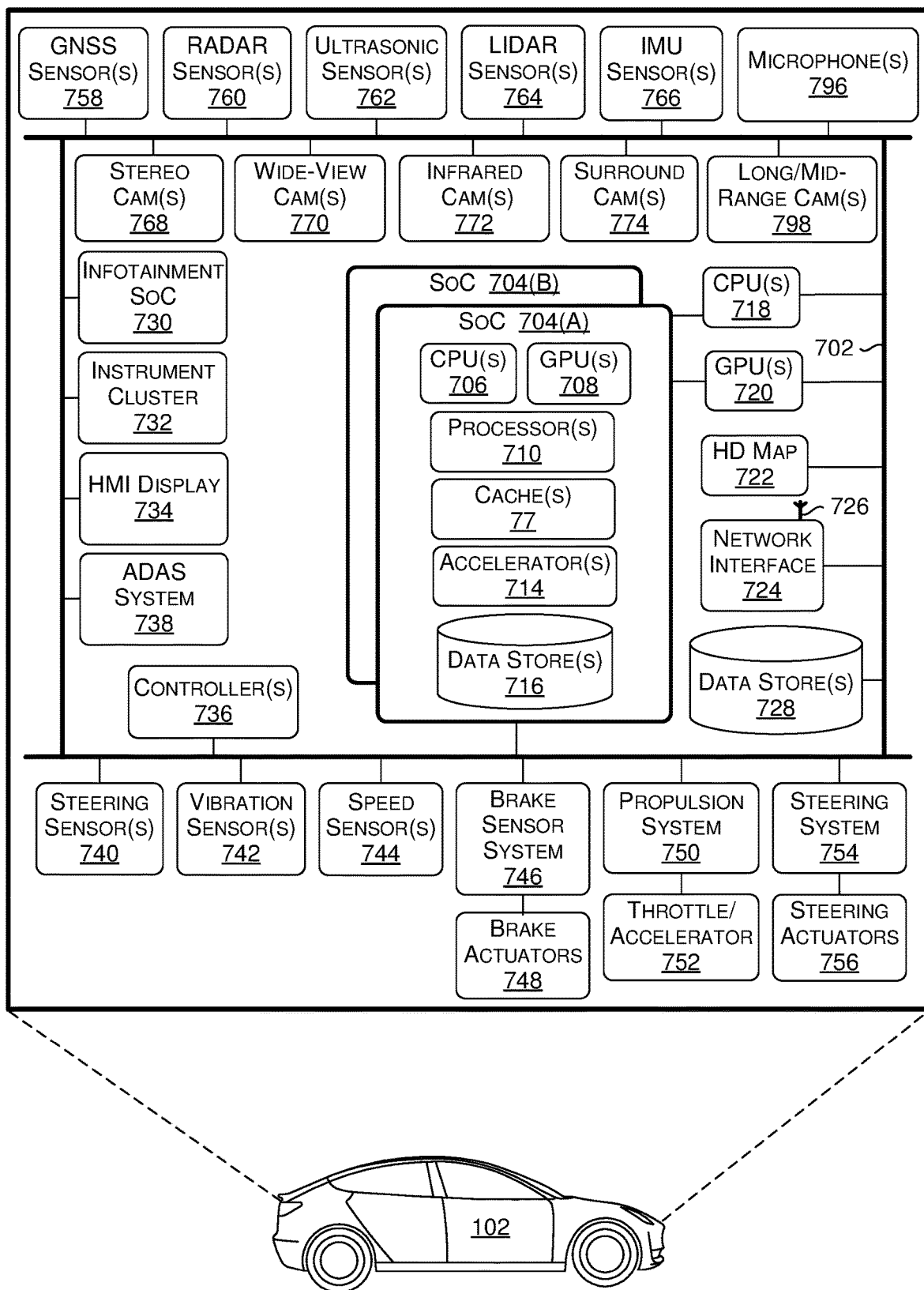
FIG. 7C is a block diagram of an example system architecture for the example autonomous vehicle of FIG. 7A, in accordance with some embodiments of the present disclosure.
Figure 7D:
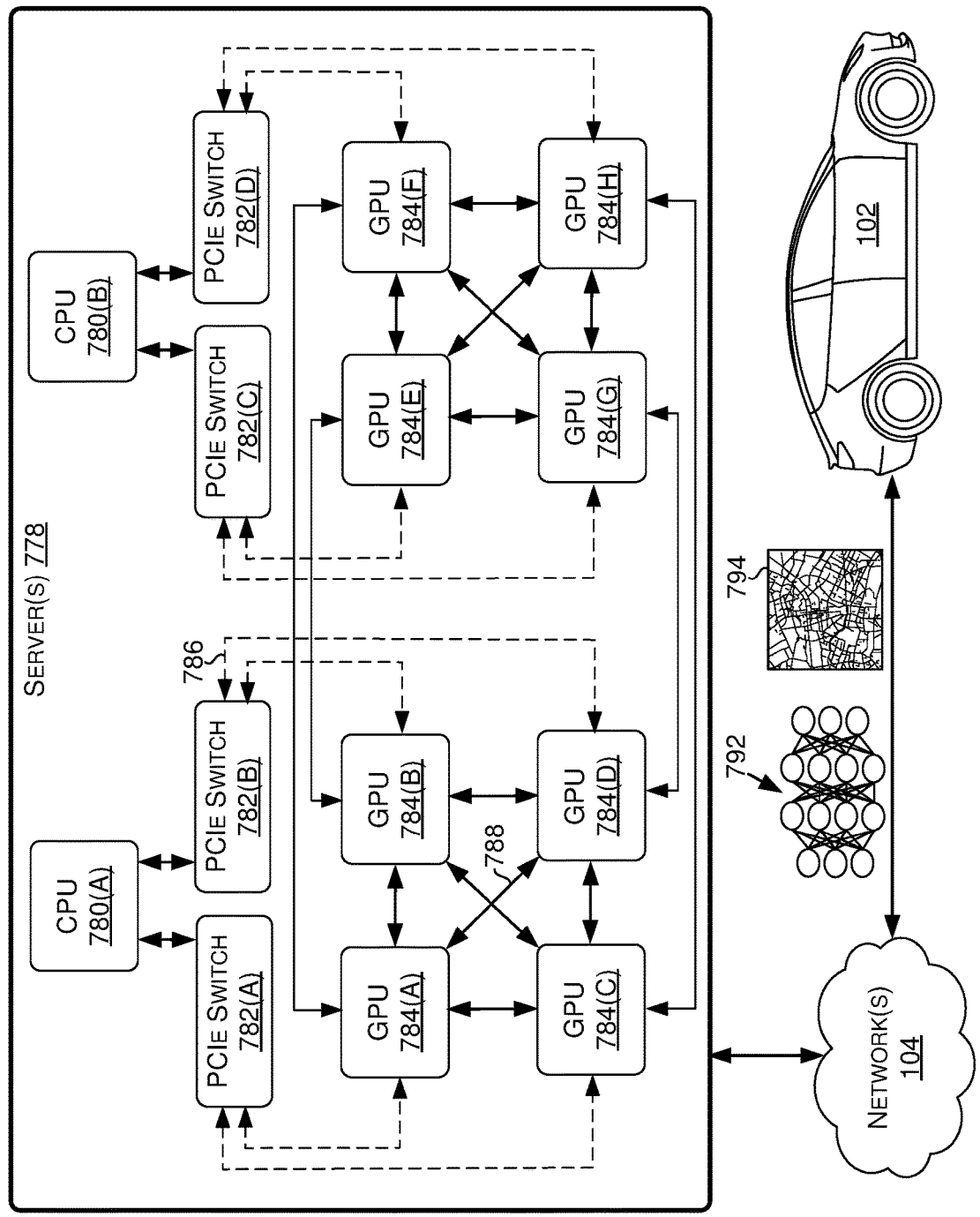
FIG. 7D is a system diagram for communication between cloud-based server(s) and the example autonomous vehicle of FIG. 7A, in accordance with some embodiments of the present disclosure.

In some examples, information from the map perceiver may be sent, transmitted, and/or provided to server(s) (e.g., to a map manager of server(s) 778 of FIG. 7D), and information from the server(s) may be sent, transmitted, and/or provided to the map perceiver and/or a localization manager of the vehicle 102. The map manager may include a cloud mapping application that is remotely located from the vehicle 102 and accessible by the vehicle 102 over the network(s) 104. For example, the map perceiver and/or the localization manager of the vehicle 102 may communicate with the map manager and/or one or more other components or features of the server(s) to inform the map perceiver and/or the localization manager of past and present drives or trips of the vehicle 102, as well as past and present drives or trips of other vehicles. The map manager may provide mapping outputs (e.g., map data) that may be localized by the localization manager based on a particular location of the vehicle 102, and the localized mapping outputs may be used by the world model manager 124 to generate and/or update the world model.

In any example, when a determination is made, based on information from the path perceiver, the wait perceiver, the map perceiver, the obstacle perceiver, and/or another component of the perception component(s) 122, that prevents the vehicle 102 from proceeding through a certain situation, scenario, and/or environment, at least partial control may be transferred to the remote control system 106. In some examples, the passengers of the vehicle 102 may be given an option to wait until the vehicle 102 is able to proceed based on internal rules, conventions, standards, constraints, etc., or to transfer the control to the remote control system 106 to enable the remote operator to navigate the vehicle 102 through the situation, scenario, and/or environment. The remote operator, once given control, may provide control inputs to the remote control(s) 118, and the vehicle 102 may execute vehicle controls corresponding to the control inputs that are understandable to the vehicle 102.

The planning component(s) 126 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints). The waypoints may be representative of a specific distance into the future for the vehicle 102, such as a number of city blocks, a number of kilometers/miles, a number of meters/feet, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 102, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 128 may follow a trajectory or path (lateral and longitudinal) that has been received from the behavior selector of the planning component(s) 126 as closely as possible and within the capabilities of the vehicle 102. In some examples, the remote operator may determine the trajectory or path, and may thus take the place of or augment the behavior selector. In such examples, the remote operator may provide controls that may be received by the control component(s) 128, and the control component(s) may follow the controls directly, may follow the controls as closely as possible within the capabilities of the vehicle, or may take the controls as a suggestion and determine, using one or more layers of the drive stack 108, whether the controls should be executed or whether other controls should be executed.

The control component(s) 128 may use tight feedback to handle unplanned events or behaviors that are not modeled and/or anything that causes discrepancies from the ideal (e.g., unexpected delay). In some examples, the control component(s) 128 may use a forward prediction model that takes control as an input variable, and produces predictions that may be compared with the desired state (e.g., compared with the desired lateral and longitudinal path requested by the planning component(s) 126). The control(s) that minimize discrepancy may be determined.

Although the planning component(s) 126 and the control component(s) 128 are illustrated separately, this is not intended to be limiting. For example, in some embodiments, the delineation between the planning component(s) 126 and the control component(s) 128 may not be precisely defined. As such, at least some of the components, features, and/or functionality attributed to the planning component(s) 126 may be associated with the control component(s) 128, and vice versa.

The obstacle avoidance component(s) 130 may aid the autonomous vehicle 102 in avoiding collisions with objects (e.g., moving and stationary objects). The obstacle avoidance component(s) 130 may include a computational mechanism at a "primal level" of obstacle avoidance that may act as a "survival brain" or "reptile brain" for the vehicle 102. In some examples, the obstacle avoidance component(s) 130 may be used independently of components, features, and/or functionality of the vehicle 102 that is required to obey traffic rules and drive courteously. In such examples, the obstacle avoidance component(s) may ignore traffic laws, rules of the road, and courteous driving norms in order to ensure that collisions do not occur between the vehicle 102 and any objects. As such, the obstacle avoidance layer may be a separate layer from the rules of the road layer, and the obstacle avoidance layer may ensure that the vehicle 102 is only performing safe actions from an obstacle avoidance standpoint. The rules of the road layer, on the other hand, may ensure that vehicle obeys traffic laws and conventions, and observes lawful and conventional right of way (as described herein).

In some examples, when controls are received from the remote control system 106, the obstacle avoidance component(s) 130 may analyze the controls to determine whether implementing the controls would cause a collision or otherwise not result in a safe or permitted outcome. In such an example, when it is determined that the controls may not be safe, or may result in a collision, the controls may be aborted or discarded, and the vehicle 102 may implement a safety procedure to get the vehicle 102 to a safe operating condition. The safety procedure may include coming to a complete stop, pulling to the side of the road, slowing down until a collision is no longer likely or imminent, and/or another safety procedure. In examples, when controls from the remote control system 106 are determined to be unsafe, control by the remote control system 106 may be transferred, at least temporarily, back to the vehicle 102.

In some examples, such as the example in FIG. 1B, the obstacle avoidance component(s) 130 may be located after the control component(s) 128 in the drive stack 108 (e.g., in order to receive desired controls from the control component(s) 128, and test the controls for obstacle avoidance). However, even though the obstacle avoidance component(s) 130 are shown stacked on top of (e.g., with respect to an autonomous driving software stack) the planning component(s) 126 and the control component(s) 128, this is not intended to be limiting. For example, the obstacle avoidance component(s) 130 may be additionally or alternatively implemented prior to either of the planning component(s) 126 or the control component(s) 128, prior to the control component(s) 128 but after the planning component(s) 126, as part of or integral to the planning component(s) 126 and/or the control component(s) 128, as part of one or more of the perception component(s) 122, and/or at a different part of the drive stack 108 depending on the embodiment. As such, the obstacle avoidance component(s) 130 may be implemented in one or more locations within an autonomous vehicle driving stack or architecture without departing from the scope of the present disclosure.

In some examples, as described herein, the obstacle avoidance component(s) 130 may be implemented as a separate, discrete feature of the vehicle 102. For example, the obstacle avoidance component(s) 130 may operate separately (e.g., in parallel with, prior to, and/or after) the planning layer, the control layer, the actuation layer, and/or other layers of the drive stack 108.

The encoder 134 may encode the sensor data from the sensor manager 120 and/or the sensor(s) 110 of the vehicle 102. For example, the encoder 134 may be used to convert the sensor data from a first format to a second format, such as a compressed, down sampled, and/or lower data size format that the first format. In such an example, the first format may be a raw format, a lossless format, and/or another format that includes more data (e.g., for image data, the first format may include a raw image format, that may include enough data to fully represent each frame of video). The second format may be in a format that includes less data, such as a lossy format and/or a compressed format (e.g., for image data, the second format may be H264, H265, MPEG-4, MP4, Advanced Video Coding High Definition (AVCHD), Audio Video Interleave (AVI), Windows Media Video (WMV), etc.). The sensor data may be compressed to a smaller data size in order to ensure efficient and effective transmission of the sensor data over the network(s) 104 (e.g., cellular networks, such as 5G).

Once the sensor data is encoded by the encoder 134, a communication component 136 of the vehicle 102 may transmit or send the encoded sensor data to the remote control system 106. Although the sensor data is described as being transmitted as encoded sensor data, this is not intended to be limiting. In some examples, there may not be an encoder 134, and/or at least some of the sensor data may be transmitted in an uncompressed or non-encoded format.

The remote control system 106 may receive the sensor data at communication component 140 of the remote control system 106. Where a communication is received and/or transmitted as a network communication, the communication component 136 and/or 140 may comprise a network interface which may use one or more wireless antenna(s) and/or modem(s) to communicate over one or more networks. By including one or more modems and/or one or more wireless antennas, the vehicle 102 may be capable of communication across different network types (e.g., Wi-Fi, cellular 4G, LTE, 5G, etc.), and may also have redundancy for when one or more networks may not be available, when one or more networks may not have a strong enough connection to transmit the sensor data, and/or for when one or more of the modems goes offline or stops working. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc.

In some examples, such as where the network strength is below a threshold, or a certain network type is not available for connection (e.g., only a 4G cellular connection is available, and 5G is preferable), only required or necessary sensor data may be transmitted to the remote control system 106 (or required or necessary sensor data may be prioritized in fitting the sensor data into network constraints). For example, during standard or normal operation, all of the sensor data may be transmitted to the remote control system 106 (e.g., sensor data from each of the sensors 110 that generate sensor data for use by the remote control system 106). However, once the network signal drops below a threshold signal strength, or once a certain network type becomes unavailable, less sensor data, such as sensor data from a subset of the sensors 110, may be transmitted.

In such examples, orientation data representative of an orientation of the VR headset 116 of the remote control system 106 may be used. For example, if the remote operator is looking toward the left-front of the virtual vehicle within the virtual environment, the sensor data from the sensor(s) 110 that have a field(s) of view of the left-front of the vehicle 102 may be determined. These sensor(s) 110 may be a left-facing camera(s), a forward-facing camera(s), a LIDAR sensor and/or RADAR sensor(s) with a field(s) of view to the left and/or front of the vehicle 102 and/or other sensor types. The orientation data may be used to inform the vehicle 102 (e.g., via one or more signals) of a subset of the sensor data that should be transmitted to the remote control system 106. As a result (e.g., based on the signal(s)), the subset of the sensor data may be encoded and transmitted across the network(s) 104 to the remote control system 106. As the remote operator continues to look around the virtual environment, updated orientation data may be generated and transmitted over the network(s) 104 to the vehicle 102, and updated subsets of the sensor data may be received by the remote control system 106. As a result, the remote operator may be presented with a field of view that includes information relevant to where the remote operator is looking, and the other portions of the virtual environment may not be streamed or rendered.

In some examples, a subset of the sensor data may be transmitted to the remote control system 106 that enables the virtual environment 156 to be rendered without providing any image data (e.g., images or video of the real-world or physical environment). For example, locations of objects, surfaces, and/or structures, as well as types of objects, surfaces, and/or structures may be determined from the sensor data, and this information may be transmitted to the remote control system 106 for generating a completely synthetic virtual environment (e.g., no images or video of the real or physical world, just a virtual world). In such an example, if it is determined a vehicle is to the left of the vehicle 102, and a person is to the right, the virtual environment may be rendered to include a vehicle and a person (e.g., generic representations) at locations that correspond to the real-world. In a more detailed example, the vehicle type of the vehicle may be determined, and the virtual environment may include a virtual representation of the vehicle type (e.g., as determined from a data store).

In other examples, a combination of a fully rendered virtual environment and image data (e.g., images or video) may be used within the virtual environment. For example, images or video may be included within the virtual environment in a field of view of the remote operator, but other portions of the virtual environment may include only virtual representations. As a result, if a remote operator changes orientation, and image data has not yet been received for the updated field of view of the remote operator, there may still be enough information within the environment (e.g., the virtual representations of the objects, surfaces, and/or structures) based on the rendering to allow the remote operator to control the vehicle 102 safely.

Although the signal strength or connection type is described as a reason for transmitting only a subset of the sensor data, this is not intended to be limiting. For example, the subset of the sensor data may be transmitted at all times, regardless of network connection strength and/or type, in order to reduce bandwidth or preserve network resources.

In some examples, once received by the remote control system 106, the sensor data (e.g., encoded sensor data) may be decoded by decoder 142 of the remote control system 106. In other examples, the encoded sensor data may be used by the virtual environment generator 114 and/or the remote control(s) 118 (e.g., for calibration) without decoding. The virtual environment generator 114 may use the sensor data to generate the virtual environment. The sensor data may include image data from camera(s), LIDAR data from LIDAR sensor(s), RADAR data from RADAR sensor(s), and/or other data types from other sensor(s) 110, such as vehicle state data and/or configuration data, as described herein. The virtual environment generator 114 may use the sensor data to generate or render the virtual environment and at least a portion of the virtual environment may be displayed on a display of the VR headset 116. Examples of the virtual environment are described in more detail herein, such as with reference to FIGS. 2A-2B.

In some examples, the virtual environment may be generated using the vehicle state data and/or the calibration data, in addition to image data, LIDAR data, SONAR data, etc. In such examples, the vehicle state data may be used to update a location and/or orientation of the virtual vehicle in the virtual environment and/or to update visual indicators of the vehicle state in the virtual environment (e.g., to update a speedometer, a revolutions per minute (RPM) display, a fuel level display, a current time where the vehicle 102 is located, an odometer, a tachometer, a coolant temperature gauge, a battery charge indicator, a gearshift indicator, a turn signal indicator, a headlight/high beam indicator, a malfunction/maintenance indicator, etc.). As a further example, the vehicle state data may be used to apply one or more rendering effects to the virtual environment, such as motion blur that is based at least in part on the velocity and/or acceleration of the vehicle 102.

In some examples, state data may be determined by the vehicle 102 for the objects and surface in the environment, and this state information may be used to generate the virtual environment (e.g., to provide visual indicators of types of objects, such as persons, vehicles, animals, inanimate objects, etc., or surfaces, such as a paved road, a gravel road, an uneven road, an even road, a driveway, a one-way street, a two-way street, etc., to provide visual indicators about objects, such as speeds of objects, directions of objects, etc., and/or other information pertaining to the environment).

The calibration data may be used to update the virtual controls (e.g., the representation of the remote control(s) 118 in the virtual environment). For some non-limiting examples, if the steering wheel is turned to the left, the virtual steering wheel may be rendered as turned to the left, if the wheels are turned to the right, the virtual wheels may be rendered to be turned to the right, if the windows are down, the virtual windows may be rendered to be down, if the seats are in a certain position, the virtual seats may be rendered to be in the certain positions, if the instrument panel and/or HMI display is on, at a certain light level, and/or showing certain data, the virtual instrument panel and/or HMI display may be on, at the certain light level, and/or showing the certain data in the virtual environment.

Any other examples for updating the virtual environment to reflect the vehicle 102 and/or other aspects of the real-world environment are contemplated within the scope of the present disclosure. By updating at least a portion of the virtual vehicle and/or other features of the virtual environment using the calibration data, the remote operator may have a more immersive, true-to-life, and realistic virtual environment to control the virtual vehicle within, thereby contributing to the ability of the remote operator to control the vehicle 102 in the real-world environment more safely and effectively.

At least some of the sensor data may be used by the remote control(s) 118, such as the calibration data for calibrating the remote control(s) 118. For example, similar to described herein with respect to updating the virtual environment using the calibration data, the remote control(s) 118 may be calibrated using the calibration data. In some examples, a steering component (e.g., a steering wheel, a joystick, etc.) of the remote control(s) 118 may be calibrated to an initial position that corresponds to the position of steering component 112A of the vehicle 102 at the time of transfer of the control to the remote control system 106. In another example, the steering component sensitivity may be calibrated using the calibration data, such that inputs to the steering component of the remote control(s) 118 (e.g., turning the steering wheel×number of degrees to the left) substantially correspond to the inputs to the steering component 112A of the vehicle 102 (e.g., the resulting actuation of the vehicle 102 may correspond to turning the steering wheel of the vehicle 102×number of degrees to the left). Similar examples may be implemented for the acceleration component and/or the braking component of the remote control(s) to correspond to the sensitivity, degree of movement, pedal stiffness, and/or other characteristics of acceleration component 112C and braking component 112B, respectively, of the vehicle 102. In some examples, any of these various calibrations may be based at least in part on the year, make, model, type, and/or other information of the vehicle 102 (e.g., if the vehicle 102 is a Year N, Make X, Model Y, the virtual vehicle may retrieve associated calibration settings from a data store).

In some examples, the calibration data may be used calibrate the remote control(s) 118 such that the remote control(s) are scaled to the vehicle 102 (or object, such as a robot), such as where the vehicle is larger, smaller, or of a different type than the virtual vehicle. For example, the vehicle 102 or object may be a small vehicle or object (e.g., that cannot fit passengers), such as a model car or an exploratory vehicle (e.g., for navigating into tight or constrained environments, such as tunnels, beneath structures, etc.), etc., or may be a larger object, such as a bus, a truck, etc. In such examples, calibration data may be used to scale the remote control(s) 118 to that of the smaller, larger, or different type of object or vehicle. For example, providing an input to the steering component of the remote control(s) 118, such as by turning a steering wheel 10 degrees, may be scaled for a smaller vehicle to 2 degrees, or for a larger vehicle, to 20 degrees. As another example, the braking component of the remote control(s) 118 may correspond to anti-skid braking control inputs, but the vehicle 102 or object, especially when small, may use skid braking. In such examples, the remote control(s) may be calibrated such that inputs to the braking component of the remote control(s) is adjusted for skid braking.

The scaling may additionally, or alternatively, be performed on the outputs of the remote control(s) (e.g., the control data). For example, after the control inputs to the remote control(s) 118, the control inputs may be scaled to correspond to the control(s) of the smaller, larger, or different type of vehicle 102 or object. This may allow the remote operator to control the virtual vehicle or object using the remote control(s) 118 in a way that feels more natural to the remote operator, but while calibrating or scaling the control data representative of the control inputs for the vehicle 102 or other object to correspond to the vehicle control data that is useable for the vehicle 102 or other object. In some examples, this may be performed by the encoder 144 of the remote control system 106, and/or by another component.

In any example, prior to transmission of the control data to the vehicle 102, the control data may be encoded by the encoder 144. The encoded control data may be in a format that is useable to the vehicle (e.g., the control data from the remote control(s) 118 may be encoded to generate vehicle control data that is useable by the vehicle 102). In other examples, the control data may be transmitted to the vehicle 102 over the network(s) 104 using the communication components 140 and 136, and the vehicle 102 may encode the control data to generate the vehicle control data. As such, the control data from the remote control(s) 118 may be converted to the vehicle control data prior to transmission by the remote control system 106, after receipt by the vehicle 102, or a combination thereof.

The control data, in some examples, may be received by the communication component 136 of the vehicle 102 and decoded by the decoder 138. The vehicle control data may then be used by at least one of the layers of the drive stack 108 or may bypass the drive stack 108 (e.g., where full control is transferred to the remote control system 106 and the vehicle 102 exits self-driving or autonomous mode completely) and be passed directly to the control components of the vehicle 102, such as the steering component 112A, the braking component 112B, the acceleration component 112C, and/or other components (e.g., a blinker, light switches, seat actuators, etc.). As such, the amount of control given to the remote control system 106 may include from no control, full control, or partial control. The amount of control of the autonomous vehicle 102 may inversely correspond to the amount of control given to the remote control system 106. Thus, when the remote control system 106 has full control, the autonomous vehicle 102 may not execute any on-board control, and when the remote control system 106 has no control, the autonomous vehicle 102 may execute all on-board control.

In examples where the vehicle control data (e.g., corresponding to the control data generated based on control inputs to the remote control(s) 118) is used by the drive stack 108, there may be different levels of use. In some examples, only the obstacle avoidance component(s) 130 may be employed. In such examples, the vehicle control data may be analyzed by the obstacle avoidance component(s) 130 to determine whether implementing the controls corresponding to the vehicle control data would result in a collision or an otherwise unsafe or undesirable outcome. When a collision or unsafe outcome is determined, the vehicle 102 may implement other controls (e.g., controls that may be similar to the controls corresponding to the vehicle control data but that decrease, reduce, or remove altogether the risk of collision or other unsafe outcome). In the alternative, the vehicle 102 may implement a safety procedure when a collision or other unsafe outcome is determined, such as by coming to a complete stop. In these examples, the control inputs from the remote control(s) 118 may be associated (e.g., one-to-one) with the controls of the vehicle 102 (e.g., the control inputs to the remote control(s) 118 may not be suggestions for control of the vehicle, such as waypoints, but rather may correspond to controls that should be executed by the vehicle 102).

As described herein, the control inputs from the remote control(s) 118 may not be direct or one-to-one controls for the vehicle 102, in some examples. For example, the control inputs to the remote control(s) 118 may be suggestions. One form of suggestion may be an actual input to a steering component, an acceleration component, a braking component, or another component of the remote control(s) 118. In such an example, the vehicle control data corresponding to these control inputs to the remote control(s) 118 may be used by the drive stack 108 to determine how much, or to what degree, to implement the controls. For example, if the remote operator provides an input to a steering component of the remote control(s) 118 (e.g., to turn a steering wheel 10 degrees), the planning component(s) 126 and/or the control component(s) 128 of the drive stack 108 may receive the vehicle control data representative of the input to the steering component, and determine to what degree to turn to the left (or to not turn left at all). The drive stack 108 may make a determination to turn left, for example, but may determine that a more gradual turn is safer, follows the road shape or lane markings more accurately, and/or otherwise is preferable over the rate of the turn provided by the remote operator (e.g., the 10 degree turn of the steering wheel). As such, the vehicle control data may be updated and/or new vehicle control data may be generated by the drive stack 108, and executed by the steering component 112A of the vehicle 102 (e.g., based at least in part on a command or signal from the actuation component(s) 132).

Similar use of the vehicle control data may be performed based at least in part on inputs to the acceleration component, braking component, and/or other components of the remote control(s) 118. For example, an input to an acceleration component of the remote control(s) 118 may cause an acceleration by the acceleration component 112C of the vehicle 102, but the acceleration rate may be less, more, or zero, depending on the determination(s) by the drive stack 108. As another example, an input to a braking component of the remote control(s) 118 may cause a braking by the braking component 112B of the vehicle 102, but the deceleration rate may be less, more, or zero, depending on the determination(s) by the drive stack 108.

Another form of suggestions from the remote control(s) 118 may be waypoint suggestions. For example, the remote operator may use a remote control 118 that is a pointer (e.g., a virtual laser pointer), and may point to virtual locations in the virtual environment that the virtual vehicle is to navigate to (e.g., a virtual waypoint). The real-world locations in the real-world environment that correspond to the virtual locations in the virtual environment may be determined, and the vehicle control data may represent the real-world locations (e.g., the real-world waypoints). As such, the drive stack 108, such as the planning component(s) 126 and/or the control component(s) 128, may use the real-world waypoint to determine a path and/or control(s) for following the path to reach the real-world waypoint. The actuation component(s) 132 may then cause the steering component 112A, the braking component 112B, the acceleration component 112C, and/or other components of the vehicle 102 to control the vehicle 102 to travel to the real-world location corresponding to the real-world waypoint. The remote operator may continue to provide these control inputs to navigate the vehicle 102 through the situation, scenario, and/or environment that necessitated the transfer of at least partial control to the remote control system 106.

Now referring to FIG. 2A-2B, FIG. 2A-2B illustrate non-limiting examples of virtual environments that may be generated by the virtual environment generator 114. In one or more embodiments, the virtual environments may be displayed on a display of the VR headset 116. Alternatively, the virtual environments may be displayed on a display corresponding to a physical representation of a vehicle. The physical representation may include any configuration of control (e.g., a steering wheel, one or more accelerators or brakes, one or more transmission controls), seating, or visibility (e.g., one or more displays positioned as mirrors) features corresponding to physical, real-world counterparts in an ego-vehicle. Virtual environment 200 of FIG. 2A may include a virtual environment where an exterior of a vehicle 202 is rendered, such that a field of view of the remote operator includes the exterior of the vehicle 202. In one or more embodiments, the vehicle 202 may be presented as a virtually simulated vehicle. Alternatively, the virtual environment 200 may be rendered in one or more displays positioned around a partially or completely physical vehicle 202 calibrated to correspond to the ego-vehicle. In the cases where the vehicle 202 comprises a virtual vehicle, the virtual vehicle 202 may be rendered on a surface 204 of the virtual environment 200. In this case, the surface 204 may be one of any number of suitable surfaces, such as a representation of a garage floor, a laboratory floor, etc. However, this is not intended to be limiting, and in some examples, the surface 204 may be rendered to represent the surface the vehicle 102 is on in the real-world environment (e.g., using sensor data generated from cameras with a field(s) of view of the surface around the vehicle 102, such as a parking camera(s)).

The sensor data, such as image data, representative of a field(s) of view of the sensor(s) 110 may be displayed within the virtual environment 200 on one or more virtual displays 206, such as the virtual displays 206A, 206B, 206C, and/or addition or alternative virtual displays 206. In some examples, the virtual display(s) 206 may be rendered to represent up to a 360 degree field of view of the sensor(s) 110 of the vehicle 102. As described herein, the surface 204 and/or an upper portion 208 of the virtual environment 200 may also be rendered to represent the real-world environment of the vehicle 102. The upper portion 208 may include buildings, trees, the sky, and/or other features of the real-world environment, such that the virtual environment 200 may represent a fully immersive environment. The surface 204 and/or the upper portion 208, similar to the virtual display(s) 206, may include images or video from image data generated by the vehicle 102, may include rendered representations of the environment as gleaned from the sensor data (e.g., image data, LIDAR data, RADAR data, etc.), or a combination thereof.

The instance of the virtual environment 200 illustrated in FIG. 2A may represent the scenario represented in the image 146. For example, the virtual display 206B may include the virtual representations of the van 152, the boxes 154, the street 148, and/or other features of the image 146. The virtual representations of the image data may include the images or video from the image data, rendered within the virtual environment 200. As such, the images or video displayed on the virtual displays 206 may be the actual images or video (e.g., not a virtual representation thereof). In other examples, the images or video displayed on the virtual displays 206 may be a rendered representation of the environment, which may be generated from the sensor data (e.g., the image data, the LIDAR data, the SONAR data, etc.).

As described herein, the vehicle state data and/or the calibration data may be used to generate the virtual environment. In such examples, wheels 210 of the virtual vehicle 202 may be rendered at approximately the wheel angle of the wheels of the vehicle 102 in the real-world environment. In this illustration, the wheels may be straight. Similarly, lights may be turned on or off, including brake lights when braking, emergency lights when turned on, etc. When the vehicle 202 includes a physical, tangible representation, the vehicle state data and/or the calibration data of the ego-vehicle may be used to calibrate and orient the physical representation vehicle 202.

When controlling a virtual vehicle 202 implemented as a virtual vehicle in the virtual environment 200, or other virtual environments where the vantage point of the remote operator is outside of the virtual vehicle 202, the remote operator may be able to move around the virtual environment 200 freely to control the virtual vehicle 202 from different vantage points (or may be able to change the vantage point to inside the virtual vehicle, as illustrated in FIG. 2B). For example, the remote operator may be able to sit on top of or above the virtual vehicle 202, to the side of the virtual vehicle 202, in front of the virtual vehicle 202, behind the virtual vehicle 202, etc.

In examples where the remote operator provides virtual waypoints rather than actual controls, a vantage point outside of the virtual vehicle 202 may be more useful. For example, the remote operator may have a vantage point from on top of the virtual vehicle 202, such as at location 212 within the virtual environment 200, and may use device 214 (e.g., a virtual pointer, a virtual laser, etc.) to identify a location within the virtual environment 200 and/or a location within the image data represented within the virtual environment 200, such as location 216. When the location 216 corresponds to the image data, such as a point(s) or pixel(s) within the image data, the real-world coordinates corresponding to the point(s) or the pixel(s) may be determined (e.g., by the vehicle 102 and/or the remote control system 106). For example, the camera(s) that captured the image data may be calibrated such that transformations from two-dimensional locations of the point(s) or the pixel(s) within the image data to three-dimensional points in the real-world environment may be computed or known. As a result, the virtual waypoints (e.g., the location 216) identified within the virtual environment 200 by the remote operator may be used to determine real-world locations (e.g., corresponding to the location 216) for the vehicle 102 to navigate to. As described herein, the vehicle 102 may use this information to determine the path, controls, and/or actuations that will control the vehicle 102 to the real-world location.

As the vehicle 102 is controlled through the real-world environment, the virtual display(s) 206 may be updated to reflect the updated sensor data over time (e.g., at the frame rate that the sensor data is captured, such as 30 frames per second ("fps"), 60 fps, etc.). As the (virtual) vehicle 202 is being controlled, the wheels, lights, windows, blinkers, etc., may be updated according to the corresponding features on the vehicle 102 in the real-world environment.

Now referring to FIG. 2B, the virtual environment 156 may be the same virtual represent 156 of FIG. 1A, described herein. Although the vantage point illustrated in FIG. 2B is from a left-side driver's seat within the virtual vehicle, this is not intended to be limiting. For example, and without departing from the scope of the present disclosure, the remote operator may have a vantage point from the position a right-side driver's seat (e.g., for jurisdictions where driving is on the left side of the road), a passenger's seat, a back seat, an imaginary seat (e.g., a middle-driver's seat), or from a vantage point within the virtual vehicle not corresponding to a seat, such as from anywhere within the virtual vehicle.

As described herein, one or more of the features of the virtual vehicle may be made at least partially transparent and/or may be removed from the rendering of the virtual vehicle. For example, certain portions of a real-world vehicle (alternatively referred to herein as "ego-vehicle" or "physical vehicle") may be used for structural support, but may cause occlusions for a driver (e.g., "blind spots). In a virtual vehicle, this need for structural support is nonexistent, so portions of the virtual vehicle that may be visually occluding may be removed and/or made at least partially transparent in the virtual environment 156. For example, the support column 166, and/or other support columns of the virtual vehicle, may be made transparent (as illustrated in FIG. 2B) or may be removed completely from the rendering. In other examples, doors 222 may be made transparent (e.g. but for an outline) or entirely removed. As a result, the remote operator may be presented with a field(s) of view that is more immersive, with less occlusions, thereby facilitating more informed, safer control.

In addition, a portion(s) of the virtual vehicle may be made at least partially transparent or be removed even where the portion(s) of the virtual vehicle does not cause occlusions, in order to allow the remote operator to visualize information about the virtual vehicle (and thus the vehicle 102) that would not be possible in a real-world environment. For example, a portion of the virtual vehicle between a vantage point of the remote operator and one or more of the wheels and/or tires of the vehicle may be made at least partially transparent or may be removed from the rendering, such that the remote operator is able to visualize an angle of the wheel(s) and/or the tire(s) (e.g., where the wheels and/or tires are at the angle based on the calibration data).

The virtual environment 156 may include, in addition to or alternatively from the features described herein with respect to FIG. 1A, a virtual instrument panel 218, virtual side-view or wing-mirrors 220, and/or other features. The virtual instrument panel 218 may display any number of different information, such as, without limitation, a speedometer, a fuel level indicator, an oil pressure indicator, a tachometer, an odometer, turn indicators, gearshift position indicators, seat belt warning light(s), parking-brake warning light(s), engine-malfunction light(s), airbag (SRS) system information, lighting controls, safety system controls, navigation information, etc. The virtual side-view or wing-mirrors 220 may display sensor data captured by one or more sensor(s) 110 (e.g., camera(s)) of the vehicle 102 with a field(s) of view to the rear and/or to the side of the vehicle 102 (e.g., to represent a side-view or wing-mirror of the vehicle 102).

Figure 3A:
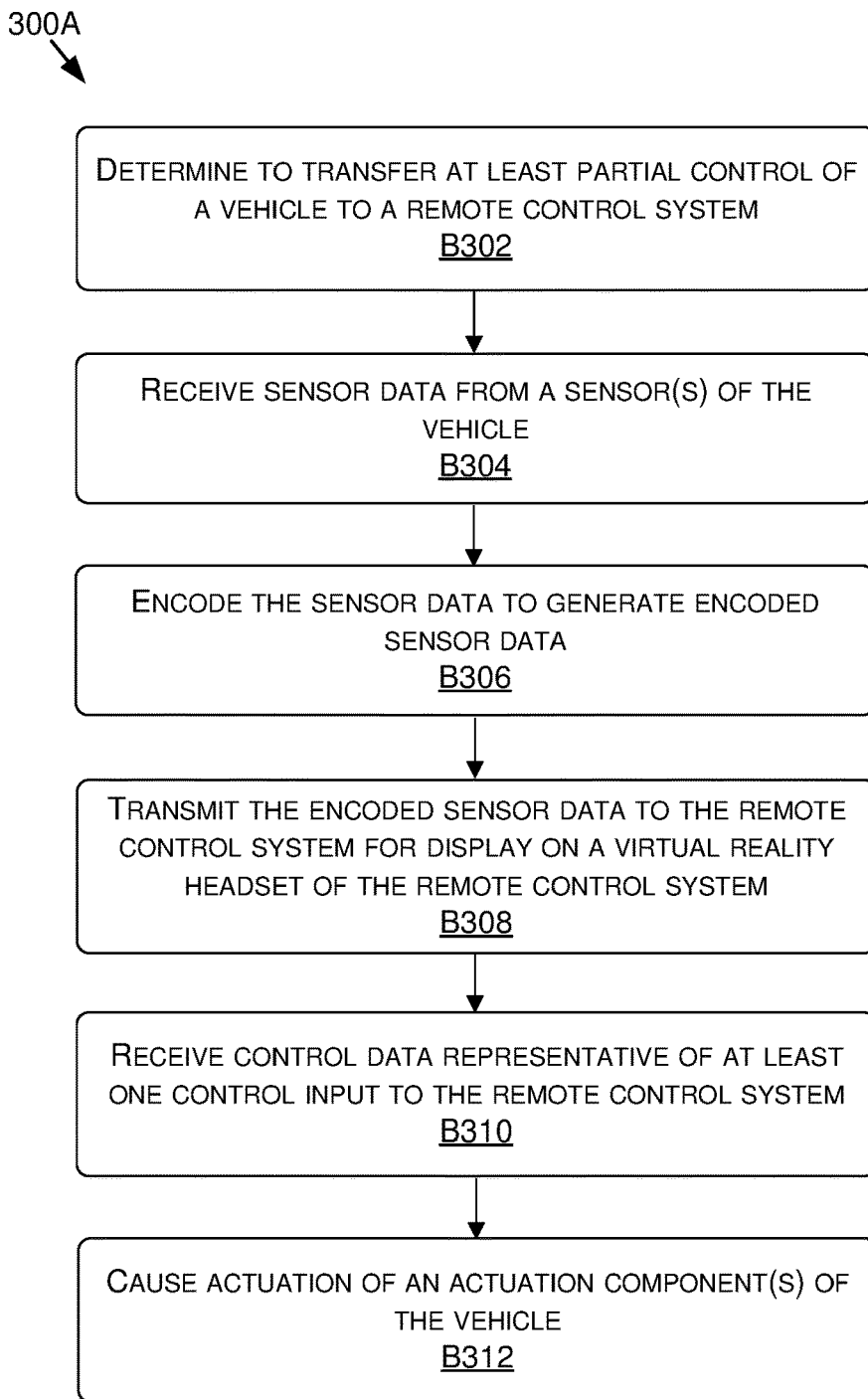
FIG. 3A is an example flow diagram for a method of remote control of an autonomous vehicle, in accordance with some embodiments of the present disclosure.
Figure 3B:
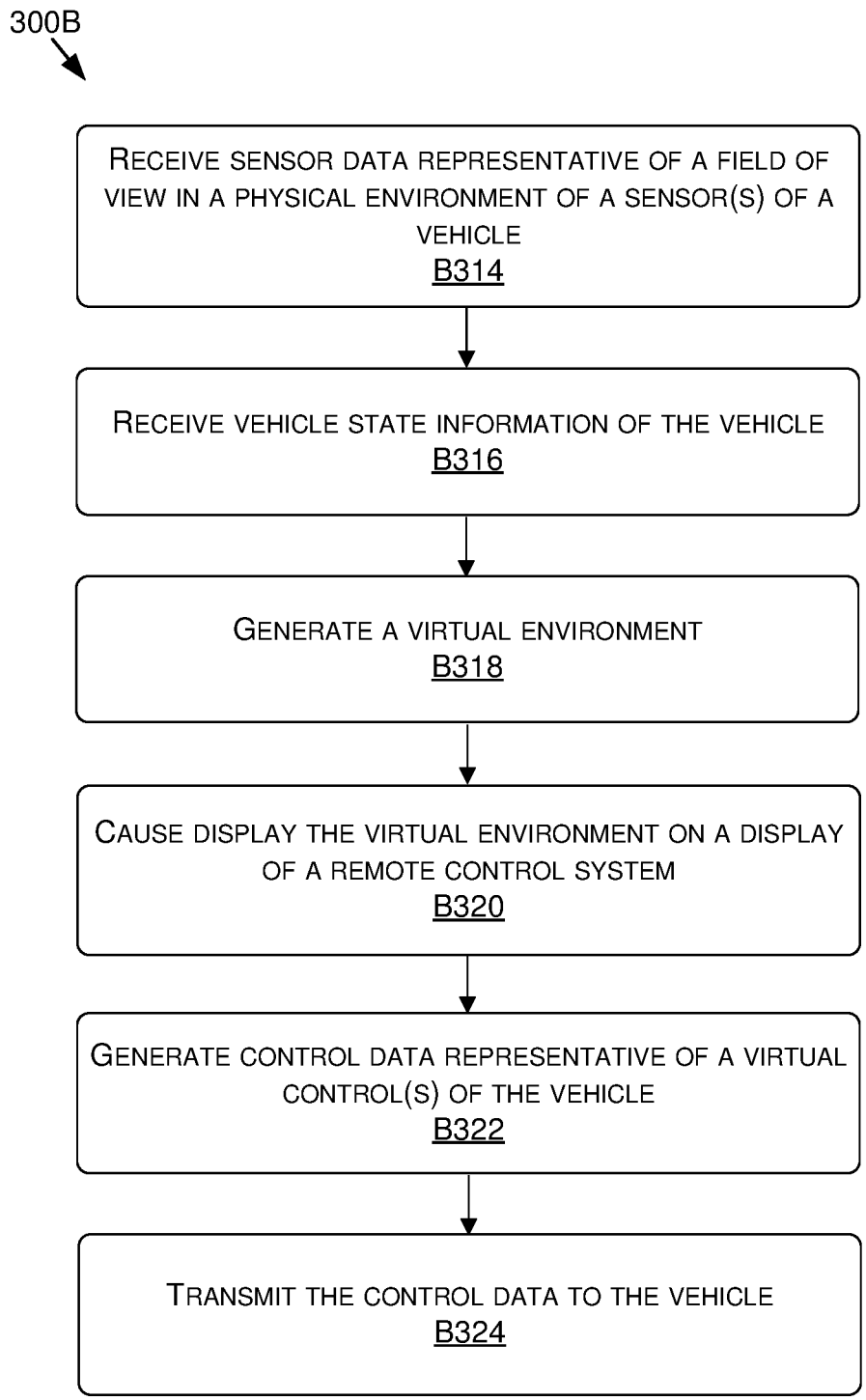
FIG. 3B is an example flow diagram for a method of remote control of an autonomous vehicle, in accordance with some embodiments of the present disclosure.

Now referring to FIGS. 3A-3B, each block of methods 300A and 300B, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 300A and 300B are described, by way of example, with respect to the autonomous vehicle control system 100 of FIGS. 1A-1B. However, these methods may additionally or alternatively be executed by any one system, or any combination of systems, including, but not limited to, those described herein.

FIG. 3A is a flow diagram showing a method 300A of remote control of an autonomous vehicle, in accordance with some embodiments of the present disclosure. The method 300A, at block B302, includes determining to transfer at least partial control of a vehicle to a remote control system. For example, the vehicle 102 (e.g., one or more components of the drive stack 108), the remote operator, a passenger, and/or another actor may determine to transfer at least partial control to the remote control system 106. In such examples, the determination may be to activate, initiate, or otherwise begin a remote control session. In examples where the vehicle 102 determines to transfer control, the determination, as described herein, may be based on a constraint on the vehicle 102 such as rules of the road, an obstacle in a path of the vehicle 102, etc., that may not allow the vehicle 102 to navigate a situation, scenario, and/or environment. The determination may be made based on an analysis of sensor data of the vehicle 102, and may be made by one or more layers of the drive stack 108 in some examples.

The method 300A, at block B304, includes receiving sensor data from a sensor(s) of the vehicle. For example, sensor data from the sensor(s) 110 may be received.

The method 300A, at block B306, includes encoding the sensor data to generate encoded sensor data. For example, the sensor data may be encoded into a different format, such as a less data intense format. If the sensor data includes image data, for example, the image data may be converted from a first format (e.g., a raw image format) to a second format (e.g., an encoded video format, such as H.264, H.265, AV1, VP9, or another image format, including but not limited to those described herein).

The method 300A, at block B308, includes transmitting the encoded sensor data to the remote control system for display by a virtual reality headset of the remote control system. For example, the encoded sensor data may be transmitted to the remote control system 106 for display on a display of the VR headset 116.

The method 300A, at block B310, includes receiving control data representative of at least one control input to the remote control system. For example, control data representative of at least one input to the remote control(s) 118 may be received from the remote control system 106. In some examples, the control data may not be in a format useable by the vehicle 102, and thus may be converted or encoded to vehicle control data useable by the vehicle 102. In other examples, the control data may be useable by the vehicle 102, or may have already been encoded by the remote control system 106 and thus the control data received may include the vehicle control data.

The method 300A, at block B312, includes causing actuation of an actuation component(s) of the vehicle. For example, the control data (and/or the vehicle control data) may be used by the vehicle 102 to cause actuation of at least one actuation component of the vehicle 102, such as the steering component 112A, the braking component 112B, and/or the acceleration component 112C.

FIG. 3B is an example flow diagram for a method 300B of remote control of an autonomous vehicle, in accordance with some embodiments of the present disclosure. The method 300B, at block B314, includes receiving sensor data representative of a field of a view in a physical environment of a sensor(s) of a vehicle. For example, sensor data representative of a field(s) of view of the sensor(s) 110 of the vehicle 102 in the real-world environment may be received.

The method 300B, at block B316, includes receiving vehicle state information of the vehicle. For example, the vehicle state information may be received from the vehicle 102.

The method 300B, at block B318, includes generating a virtual environment. For example, the virtual environment generator 114 may generate a virtual environment based on the sensor data, the vehicle state data, and/or calibration data.

The method 300B, at block B320, includes causing display of the virtual environment on a display of a remote control system. For example, the virtual environment may be displayed on a display of the VR headset 116 of the remote control system 106.

The method 300B, at block B322, includes generating control data representative of a virtual control(s) of the vehicle. For example, control data representative of control input(s) to the remote control(s) 118 for controlling a virtual vehicle may be generated.

The method 300B, at block B324, includes transmitting the control data to the vehicle. For example, the control data may be transmitted to the vehicle 102. In some examples, prior to transmission, the control data may be encoded to create vehicle control data useable by the vehicle 102.

Figure 4:
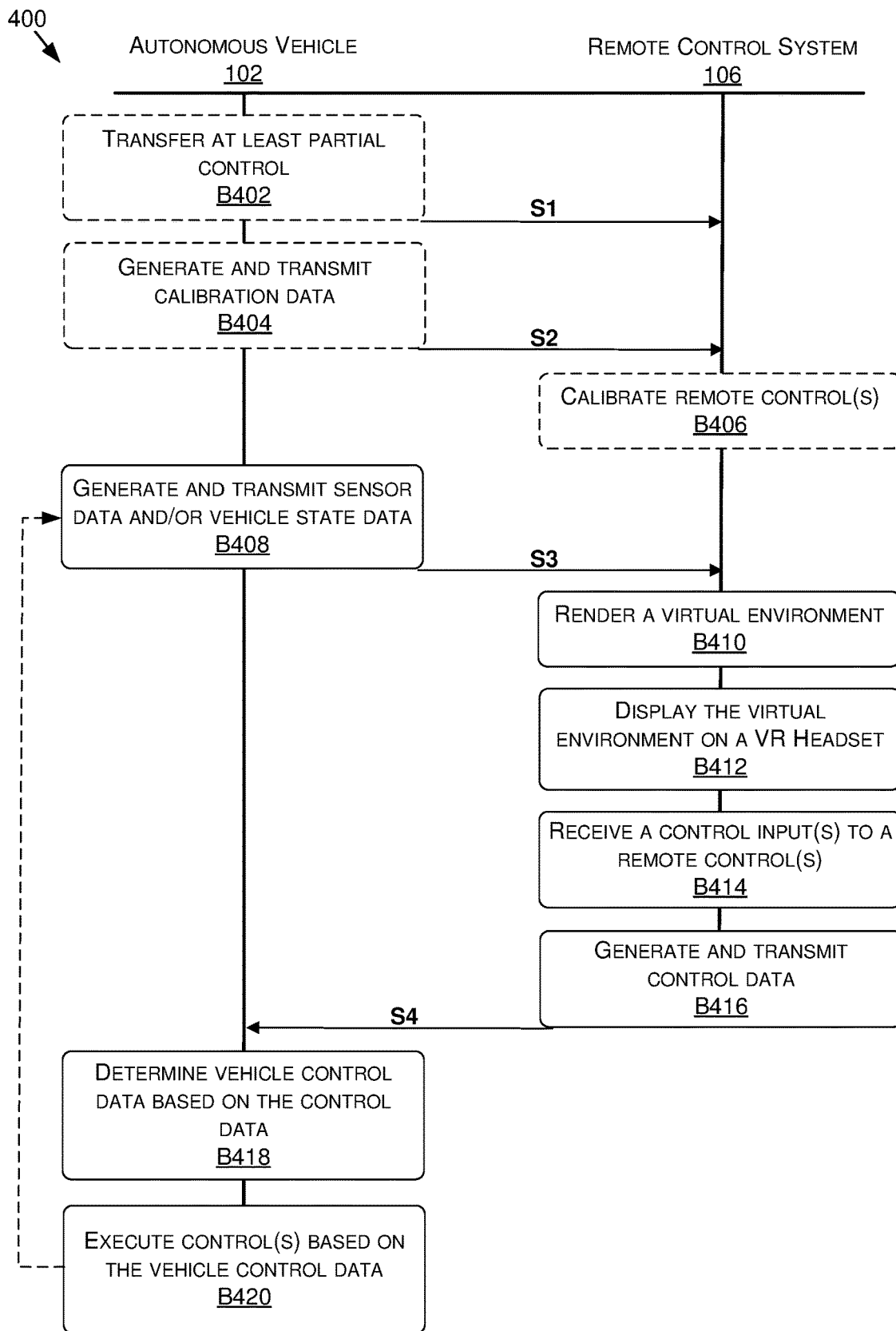
FIG. 4 is an example signal flow diagram for a method of remote control of an autonomous vehicle, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the autonomous vehicle control system 100 of FIGS. 1A-1B. However, these methods may additionally or alternatively be executed by any one system, or any combination of systems, including, but not limited to, those described herein.

FIG. 4 is an example signal flow diagram for a method 400 of remote control of an autonomous vehicle, in accordance with some embodiments of the present disclosure. The method 400, as illustrated in FIG. 4, may begin at the top of the page and end at the bottom. However, this is not intended to be limiting, and one or more of the blocks may be in alternative order and/or may be removed, or one or more additional or alternative blocks may be used in the method 400 without departing from the scope of the present disclosure.

The method 400, at block B402, includes transferring at least partial control. For example, at least partial control may be transferred by the vehicle 102 to the remote control system 106. In such examples, a signal(s), S1, may be generated and transmitted from the autonomous vehicle 102 (e.g., via the communication component 136) to the remote control system 106 (e.g., via the communication component 140) to inform the remote control system 106 that at least partial control is being transferred. The signal(s), S1, may be representative of data indicating that control is being transferred. The transfer of control may not be executed, in some examples, as illustrated by the dashed lines. For example, where control of the vehicle 102 or object is always performed by the remote control system 106, there may not be a need to transfer control.

The method 400, at block B404, includes generating and transmitting calibration data. For example, the sensor(s) 110 of the autonomous vehicle 102 may generate calibration data, and the autonomous vehicle 102 may transmit the calibration data to the remote control system 106 (e.g., via the communication component 136 and/or 140). In such examples, a signal(s), S2, may be generated and transmitted from the autonomous vehicle 102 to the remote control system 106 that represents the calibration data. The generating and transmitting of the calibration data may not be executed, in some examples, as illustrated by the dashed lines.

The method 400, at block B406, includes calibrating remote control(s). For example, the calibration data received via the signal(s), S2, may be used by the remote control system 106 to calibrate the remote control(s) 118. The calibrating of the remote control(s) 118 may not be executed, in some examples, as illustrated by the dashed lines.

The method 400, at block B408, includes generating and transmitting sensor data and/or vehicle state data. For example, the sensor(s) 110 of the autonomous vehicle 102 may generate sensor data and/or vehicle state data and the autonomous vehicle 102 may transmit the sensor data and/or the vehicle state data to the remote control system 106 (e.g., via the communication component 136 and/or 140). In such examples, a signal(s), S3, may be generated and transmitted from the autonomous vehicle 102 to the remote control system 106 that represents the sensor data and/or the vehicle state data.

The method 400, at block B410, includes rendering a virtual environment. For example, the virtual environment generator 114 may generate and/or render the virtual environment based on the sensor data, the vehicle state data, and/or the calibration data.

The method 400, at block B412, includes displaying the virtual environment on a VR headset. For example, the virtual environment, or at least a portion thereof, may be displayed on the VR headset 116 of the remote control system 106.

The method 400, at block B414, includes receiving control input(s) to remote control(s). For example, the remote operator may provide one or more control inputs to the remote control(s) 118.

The method 400, at block B416, includes generating and transmitting control data. For example, the remote control(s) 118 of the remote control system 106 may generate control data based on the control input(s) and the remote control system 106 may transmit the control data to the autonomous vehicle 102 (e.g., via the communication component 136 and/or 140). In such examples, a signal(s), S4, may be generated and transmitted from the remote control system 106 to the autonomous vehicle 102 that represents the control data.

The method 400, at block B418, includes determining vehicle control data based on the control data. For example, the autonomous vehicle 102 may determine whether the control data is useable by the vehicle 102 and, if not, may generate vehicle control data that corresponds to the control data but that is useable by the vehicle 102.

The method 400, at block B420, includes executing control(s) based on the vehicle control data. For example, one or more controls may be executed by the vehicle 102 that may correspond to the control input(s) to the remote control system 106.

Figure 5A:
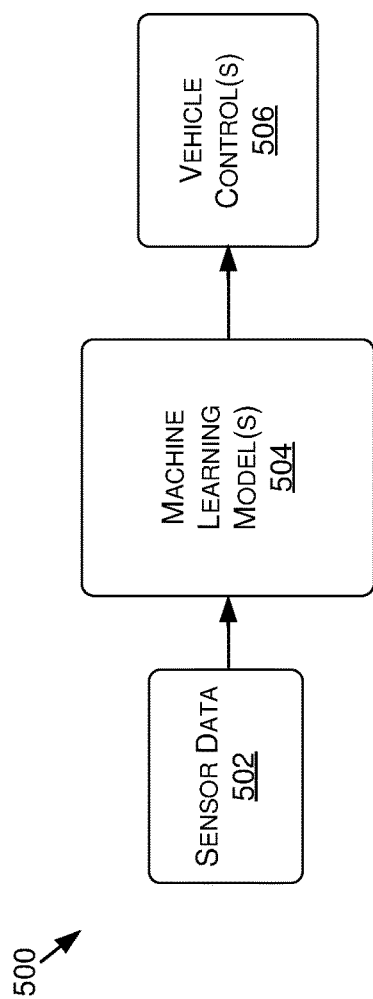
FIG. 5A is an example data flow diagram illustrating a process for training an autonomous vehicle using a machine learning model(s), in accordance with some embodiments of the present disclosure.

Now referring to FIG. 5A, FIG. 5A is an example data flow diagram illustrating a process 500 for training an autonomous vehicle using a machine learning model(s), in accordance with some embodiments of the present disclosure. Any number of inputs, including but not limited to sensor data 502 and/or control data representative of control input(s) to remote control(s) 118 of the remote control system 106, may be input into a machine learning model(s) 504.

The machine learning model(s) 504 may generate or compute any number of outputs, including but not limited to vehicle control data representative of vehicle control(s) 506 for controlling the vehicle 102. In some examples, the output may be control data, such as the control data generated by the remote control(s) 118 of the remote control system 106, and the control data may be, where necessary, encoded or otherwise converted to vehicle control data representative of the vehicle control(s) 506 useable by the vehicle 102. In some examples, the vehicle control(s) 506 may include vehicle trajectory information, such as a path, or points along a path, that the vehicle 102 should navigate along within the environment. The vehicle control(s) 506 may be transmitted or sent to a control component(s) 128, planning component(s) 126, and/or other layers of the drive stack 108, and the control component(s) 128, the planning component(s) 126, and/or other layers of the drive stack 108 may use the vehicle control(s) 508 to control the vehicle 102 according to the vehicle control(s) 506.

The sensor data 502 may be image data, LIDAR data, SONAR data, and/or data from one or more other sensors 110 of the vehicle 102 that may be representative of the real-world environment of the vehicle 102. In some examples, the sensor data may further include vehicle state data representative of the state of the vehicle 102, such as speed, velocity, acceleration, deceleration, orientation or pose, location or position in the environment and/or other status information. This data may be captured by and/or received from one or more of the sensors 110 of the vehicle 102, such as one or more of the IMU sensor(s) 766, speed sensor(s) 744, steering sensor(s) 740, vibration sensor(s) 742, and/or one or more sensors of the brake sensor system 746, propulsion system 750, and/or steering system 754. The vehicle state data (e.g., speed, orientation, etc.) may be valuable to the machine learning model(s) 504 in computing the vehicle control(s) 506 as the vehicle state data may inform the machine learning model(s) 504 as to what vehicle control(s) 506 are most useful given the current vehicle state.

For example, the vehicle 102 may transfer at least partial control to the remote control system 106 as a result of encountering a situation, scenario, and/or environment that the vehicle 102 is not permitted to handle autonomously (e.g., due to one or more constraints). A remote operator may control the virtual vehicle through the virtual environment, and the control inputs by the remote operator may be represented by control data. The control data may then be encoded or converted to vehicle control data useable by the vehicle 102, and the vehicle 102 may be controlled through the situation, scenario, and/or environment based on the vehicle control data. Throughout the remote control session, the sensor(s) 110 of the vehicle 102 may generate sensor data 502. The sensor data 502 (e.g., image data and/or vehicle state data) may be input into the machine learning model(s) 504, and the machine learning model(s) 504 may learn (e.g. using ground truth control data) the vehicle control(s) 506 for navigating the situation, scenario, and/or environment, and/or similar situations, scenarios, and/or environments, such that during a next occurrence, the vehicle 102 may be able to navigate itself through the situation, scenario, and/or environment without the need for the remote control system 106.

The machine learning model(s) 504 may include any type of machine learning model(s), such as machine learning models using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models.

Figure 5B:
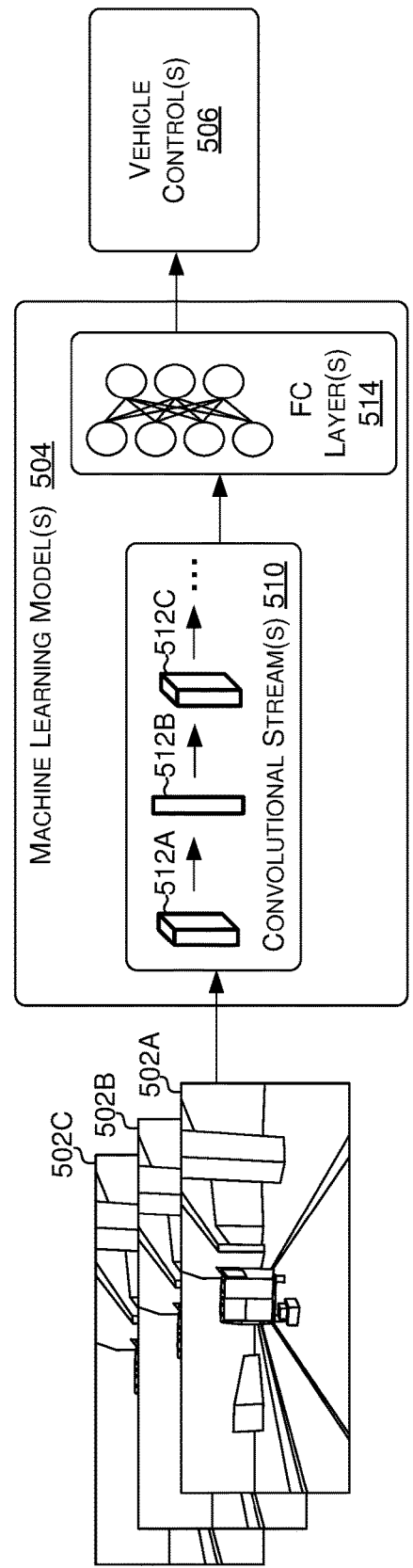
FIG. 5B is an example illustration of a machine learning model(s) for training an autonomous vehicle according to the process of FIG. 5A, in accordance with some embodiments of the present disclosure.

Now referring to FIG. 5B, FIG. 5B is an example illustration of a machine learning model(s) for training an autonomous vehicle according to the process of FIG. 5A, in accordance with some embodiments of the present disclosure. The machine learning model(s) 504 of FIG. 5B may be one example of a machine learning model(s) that may be used in the process 500. However, the machine learning model(s) 504 of FIG. 5B is not intended to be limiting, and the machine learning model(s) 504 may include additional and/or different machine learning models than the machine learning model(s) 504 of FIG. 5B. The machine learning model(s) 504 of FIG. 5B may include a convolutional neural network and thus may alternatively be referred to herein as convolutional neural network 504 or convolutional network 504.

The convolutional network 504 includes the sensor data 502 representative of one or more images generated based on image data from one or more camera(s) of the vehicle 102. In some examples, the convolutional network 504 may also include other inputs as sensor data, such as LIDAR data, RADAR data, vehicle state data, etc. The sensor data 502 may be input into convolutional stream(s) 510 of the convolutional network 504. For example, sensor data from each sensor (e.g., where two or more sensors are used) may be input its own convolutional stream 510.

A convolutional stream 510 may include any number of layers, such as the layers 512A-512C. One or more of the layers may include an input layer. The input layer may hold values associated with the sensor data. For example, the input layer may hold values representative of the raw pixel values of the image(s) input to the convolutional network 504 as a volume (e.g., a width, a height, and color channels (e.g., RGB), such as 32×32×3).

One or more layers may include convolutional layers. The convolutional layers may compute the output of neurons that are connected to local regions in an input layer (e.g., the input layer), each computing a dot product between their weights and a small region they are connected to in the input volume. A result of the convolutional layers may be another volume, with one of the dimensions based at least in part on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include a fully connected layer. Each neuron in the fully connected layer(s) may be connected to each of the neurons in the previous volume. The fully connected layer may compute class scores, and the resulting volume may be 1×1×number of classes. In some examples, the convolutional stream(s) 510 may include a fully connected layer, while in other examples, a fully connected layer 514 of the convolutional network 504 may be the fully connected layer for the convolutional stream(s) 510.

Although input layers, convolutional layers, pooling layers, ReLU layers, and fully connected layers are discussed herein with respect to the convolutional stream(s) 510, this is not intended to be limiting. For example, additional or alternative layers may be used in the convolutional stream(s) 510, such as normalization layers, SoftMax layers, and/or other layer types. Further, the order and number of layers of the convolutional network 504 and/or the convolutional stream 510 is not limited to any one architecture.

In addition, some of the layers may include parameters (e.g., weights), such as the convolutional layers and the fully connected layers, while others may not, such as the ReLU layers and pooling layers. In some examples, the parameters may be learned by the convolutional stream 510 and/or the fully connected layer(s) 514 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited, and may differ depending on the embodiment.

The output of the convolutional stream(s) 510 may be input to the fully connected layer(s) 514 of the convolutional network 504. In addition to the output of the convolutional stream(s) 510, variable(s), at least some of which may be representative of the vehicle state, may be input to the fully connected layer(s) 514.

The machine learning model(s) 504 may be trained using example control data (e.g., vehicle control data, trajectories, etc.) as ground truth data and/or sensor data 502 for given inputs to the machine learning model 504. In some examples, the control data may be based on the control inputs to the remote control(s) 118 of the remote control system 106, and/or based on the vehicle control data generated as a result of the control inputs. In some examples, the training data may correspond to a virtual vehicle, such as a vehicle driven in a virtual simulation comprising a virtual environment.

Figure 6:
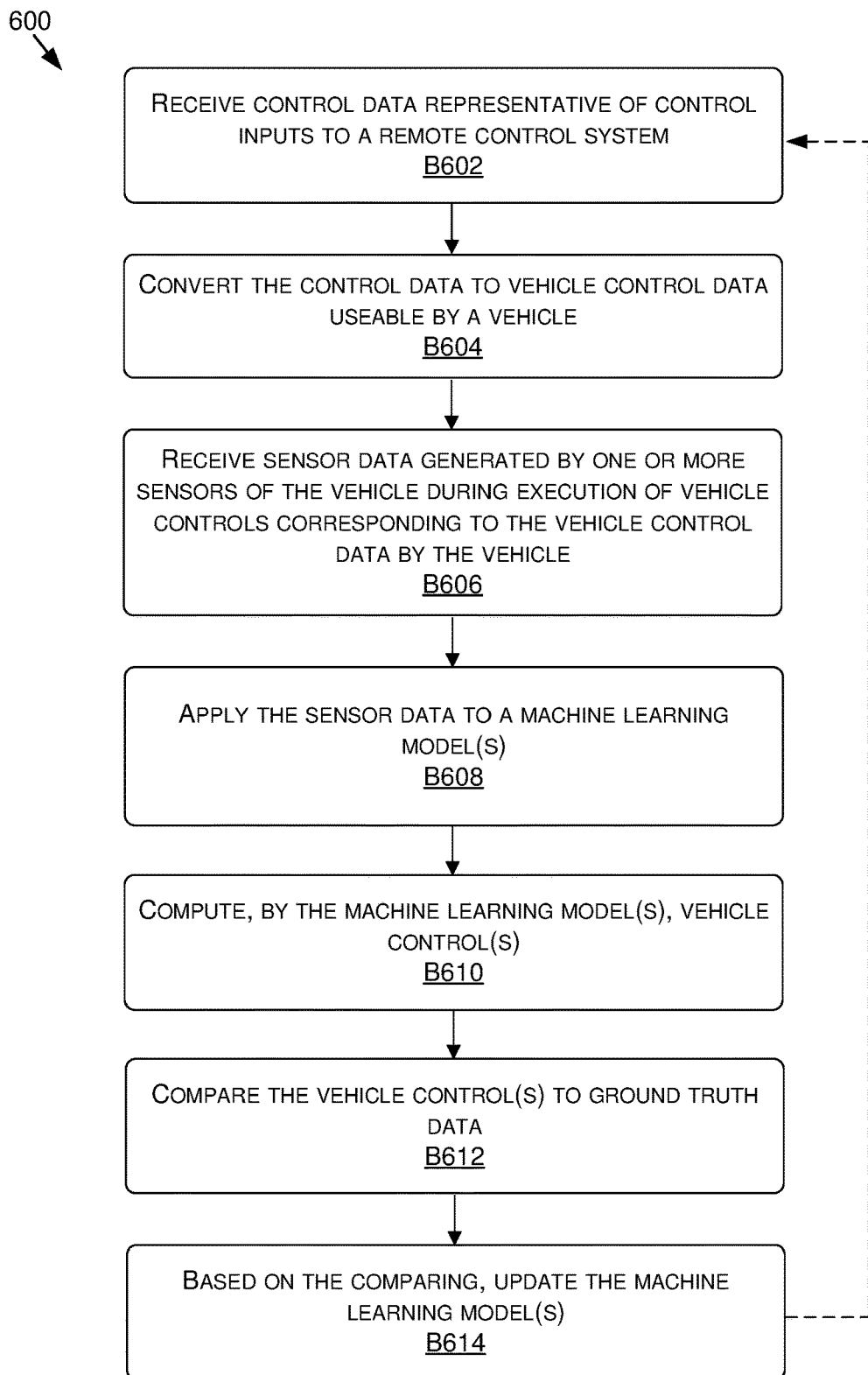
FIG. 6 is an example flow diagram for a method of training an autonomous vehicle using a machine learning model(s), in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 may be executed by any one system, or any combination of systems, including but not limited to those described herein.

FIG. 6 is an example flow diagram for a method 600 of training an autonomous vehicle using a machine learning model(s), in accordance with some embodiments of the present disclosure. The method 600, at block B602, includes receiving control data supplied from a remote control system representative of control inputs. For example, control data representative of control inputs supplied by a remote control system 106 may be received (e.g., by the remote control system 106, by a model training server(s), by the vehicle 102, etc.).

The method 600, at block B604, includes converting the control data to vehicle control data usable by a vehicle. For example, the control data may be converted to vehicle control data that is useable by a vehicle (e.g., by the vehicle 102).

The method 600, at block B606, includes receiving sensor data generated by one or more sensors of the vehicle during executing of vehicle controls corresponding to the vehicle control data by the vehicle. For example, sensor data may be received (e.g., by the remote control system 106, the model training server(s), the vehicle 102, etc.), where the sensor data is or was generated during execution of vehicle controls corresponding to the vehicle control data. The vehicle controls may be the controls from the control component(s) 128, the planning component(s) 126, the actuation component(s) 132, the steering component 112A, the braking component 112B, the acceleration component 112C, and/or other components of the vehicle 102 (and/or another vehicle or object).

The method 600, at block B608, includes applying the vehicle control data and/or the sensor data to a machine learning model(s). For example, the sensor data (e.g., image data, LIDAR data, SONAR data, vehicle state data, etc.) may be applied to the machine learning model(s) (e.g., the machine learning model(s) 504 of FIGS. 5A-5B). In some examples, the sensor data may be applied to the machine learning model(s) and the vehicle control data may be used as ground truth data to train the machine learning model(s).

The method 600, at block B610, includes computing, by the machine learning model(s), vehicle control(s). For example, the machine learning model(s) may compute vehicle control(s) (e.g., represented as vehicle control data) that correspond to the sensor data.

The method 600, at block B612, includes comparing the vehicle control(s) to ground truth data. For example, the ground truth data may include the vehicle control data and/or paths or trajectories through the environment as labeled or annotated within the representations of the sensor data (e.g., the images).

The method 600, at block B614, includes, based on the comparing at block B612, updating the machine learning model(s). For example, the parameters (e.g., weights, biases, etc.) of the machine learning model(s) may be updated (e.g., using backpropagation, parameter updates, etc.). This process may repeat until the machine learning model(s) has acceptable or desirable accuracy.

As a result of the method 600, the machine learning model(s) may be trained such that the machine learning model(s), once deployed, may take sensor data as an input and generate vehicle control(s) for navigating through environments, situations, and/or scenarios without the need for remote control. As such, over time, the remote control system 106 may be used to train the vehicle 102 (and/or other vehicles or objects) how to navigate different types of scenarios, situations, and/or environments until the need for remote control, or a remote control system 106, may become unnecessary.

Example Autonomous Vehicle

FIG. 7A is an illustration of an example autonomous vehicle 102, in accordance with some embodiments of the present disclosure. The autonomous vehicle 102 (alternatively referred to herein as the "vehicle 102") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 102 may be capable of functionality in accordance with one or more of Level 3-Level 5 of the autonomous driving levels. For example, the vehicle 102 may be capable of conditional automation (Level 3), high automation (Level 4), and/or full automation (Level 5), depending on the embodiment.

The vehicle 102 may include components such as a chassis, a vehicle body, wheels (e.g., 2, 4, 6, 8, 18, etc.), tires, axles, and other components of a vehicle. The vehicle 102 may include a propulsion system 750, such as an internal combustion engine, hybrid electric power plant, an all-electric engine, and/or another propulsion system type. The propulsion system 750 may be connected to a drive train of the vehicle 102, which may include a transmission, to enable the propulsion of the vehicle 102. The propulsion system 750 may be controlled in response to receiving signals from the throttle/accelerator 752.

A steering system 754, which may include a steering wheel, may be used to steer the vehicle 102 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 102. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 102. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 102 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 102), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 102 and provide outputs (e.g., represented by output data, display data, etc.) via a human-machine interface (HMI) display 734, an audible annunciator, a loudspeaker, and/or via other components of the vehicle 102. The outputs may include information such as vehicle velocity, speed, time, map data (e.g., the HD map 722 of FIG. 7C), location data (e.g., the vehicle's 102 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 102 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 7B is an example of camera locations and fields of view for the example autonomous vehicle 102 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 102.

The camera types for the cameras may include, but are not limited to, digital cameras that may be adapted for use with the components and/or systems of the vehicle 102. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 102 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 102. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 102 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 102. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 102 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

FIG. 7C is a block diagram of an example system architecture for the example autonomous vehicle 102 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 102 in FIG. 7C are illustrated as being connected via bus 702. The bus 702 may include a Controller Area Network (CAN) data interface (alternatively referred to herein as a "CAN bus"). A CAN may be a network inside the vehicle 102 used to aid in control of various features and functionality of the vehicle 102, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 102, and two or more busses 702 may communicate with the same components. In some examples, each SoC 704, each controller 736, and/or each computer within the vehicle may have access to the same input data (e.g., inputs from sensors of the vehicle 102), and may be connected to a common bus, such the CAN bus.

The vehicle 102 may include one or more controller(s) 736, such as those described herein with respect to FIG. 7A. The controller(s) 736 may be used for a variety of functions. The controller(s) 736 may be coupled to any of the various other components and systems of the vehicle 102, and may be used for control of the vehicle 102, artificial intelligence of the vehicle 102, infotainment for the vehicle 102, and/or the like.

The vehicle 102 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 102 in a variety of platforms and systems. For example, the SoC(s) 704 may be combined in a system (e.g., the system of the vehicle 102) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61506 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate realtime visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 102 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 102 into a chauffeur to safe stop mode (e.g., bring the vehicle 102 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 102, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 102. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 102 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 102.

The vehicle 102 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 102 information about vehicles in proximity to the vehicle 102 (e.g., vehicles in front of, on the side of, and/or behind the vehicle 102). This functionality may be part of a cooperative adaptive cruise control functionality of the vehicle 102.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 102 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 102 may further include GNSS sensor(s) 758. The GNSS sensor(s) 758 (e.g., GPS and/or assisted GPS sensors), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 102 may further include RADAR sensor(s) 760. The RADAR sensor(s) 760 may be used by the vehicle 102 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 102 surroundings at higher speeds with minimal interference from traffic in adjacent lanes. The other two antennae may expand the field of view, making it possible to quickly detect vehicles entering or leaving the vehicle's 102 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 102 may further include ultrasonic sensor(s) 762. The ultrasonic sensor(s) 762, which may be positioned at the front, back, and/or the sides of the vehicle 102, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 102 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 102 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 102 m, with an accuracy of 2 cm-3 cm, and with support for a 102 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 102. The LIDAR sensor(s) 764, in such examples, may provide up to a 720-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 102. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 102, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 102 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 102. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 102. The types of cameras used depends on the embodiments and requirements for the vehicle 102, and any combination of camera types may be used to provide the necessary coverage around the vehicle 102. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 102 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 102 may include an ADAS system 738. The ADAS system 738 may include a SoC, in some examples. The ADAS system 738 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 102 and automatically adjust the vehicle speed to maintain a safe distance from vehicles ahead. Lateral ACC performs distance keeping, and advises the vehicle 102 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 102), while the I2V communication concept provides information about traffic further ahead. CACC systems may include either or both I2V and V2V information sources. Given the information of the vehicles ahead of the vehicle 102, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 102 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 102 if the vehicle 102 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 102 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 102, the vehicle 102 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 102 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 102. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 102. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 102) fail. In such an example, the infotainment SoC 730 may put the vehicle 102 into a chauffeur to safe stop mode, as described herein.

The vehicle 102 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

FIG. 7D is a system diagram for communication between cloud-based server(s) and the example autonomous vehicle 102 of FIG. 7A, in accordance with some embodiments of the present disclosure. The system 776 may include server(s) 778, network(s) 104, and vehicles, including the vehicle 102. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 104 and from the vehicles, image data representative of images showing unexpected or changed road conditions, such as recently commenced road-work. The server(s) 778 may transmit, over the network(s) 104 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 104, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 102. For example, the deep-learning infrastructure may receive periodic updates from the vehicle 102, such as a sequence of images and/or objects that the vehicle 102 has located in that sequence of images (e.g., via computer vision and/or other machine learning object classification techniques). The deep-learning infrastructure may run its own neural network to identify the objects and compare them with the objects identified by the vehicle 102 and, if the results do not match and the infrastructure concludes that the AI in the vehicle 102 is malfunctioning, the server(s) 778 may transmit a signal to the vehicle 102 instructing a fail-safe computer of the vehicle 102 to assume control, notify the passengers, and complete a safe parking maneuver.

For inferencing, the server(s) 778 may include the GPU(s) 784 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
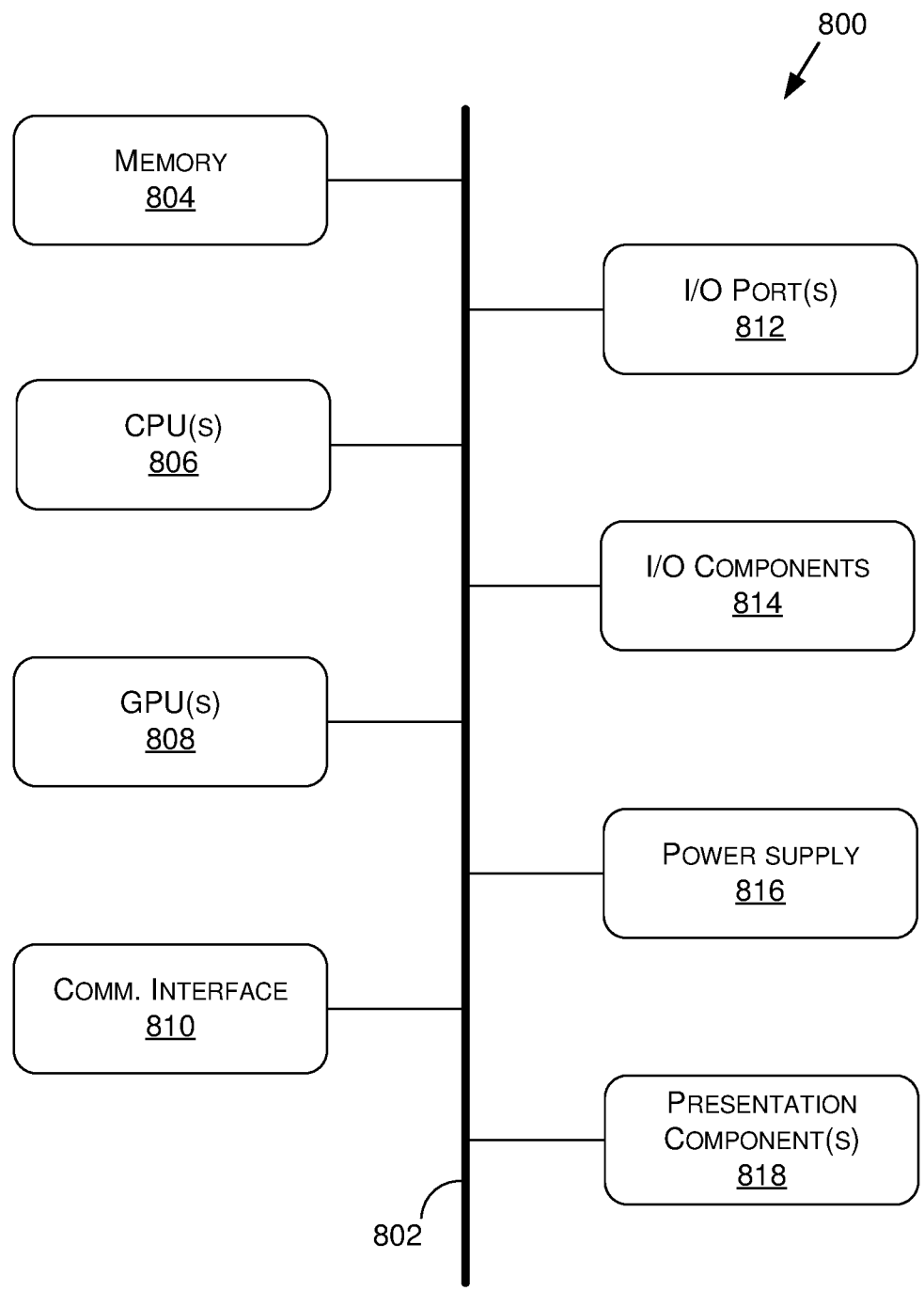
FIG. 8 is a block diagram of an example computing device suitable for use in implementing some embodiments of the present disclosure.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 708 may include two or more GPUs operating in parallel (e.g., via a link). When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics.

The communication interface 810 may include one or more receivers, transmitters, and/or transceivers that enable the computing device 700 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
processing circuitry to:
compute, using a machine learning model and based at least in part on sensor data generated using one or more sensors of a first ego-machine, data representative of one or more control outputs for navigating an environment of the first ego-machine, the machine learning model being trained using ground truth control data generated using a remote control system controlling a second ego-machine as the second ego-machine generates training sensor data; and
generate one or more control commands to perform, using the first ego-machine, one or more operations within the environment based at least in part on the one or more control outputs.

2. The processor of claim 1, wherein the machine learning model is a neural network.

3. The processor of claim 1, wherein the ground truth control data is generated by:
receiving, from the remote control system, one or more inputs to one or more controls of the remote control system; and
converting the one or more inputs to the ground truth control data.

4. The processor of claim 3, wherein the one or more controls include at least one of a steering wheel, a braking component, an acceleration component, a pointer, or a controller.

5. The processor of claim 1, wherein the ground truth data and the training sensor data are generated based at least in part on a remote control session between the second ego-machine and the remote control system, further wherein the remote control session includes at least partial control of the second ego-machine being transferred to the remote control system.

6. The processor of claim 1, wherein the one or more control outputs include correspond to trajectory information including at least one of a path or points along a path for the first ego-machine to follow.

7. The processor of claim 1, wherein the computation, using the machine learning model, is further based at least in part on state data representative of a state of the first ego-machine, the state including one or more of a speed, velocity, acceleration, deceleration, orientation, pose, location, or position of the first ego-machine.

8. The processor of claim 1, wherein the processor is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot; or
a system implemented at least partially using cloud computing resources.

9. A system comprising:
one or more processing units; and
one or more memory units storing instructions that, when executed by the one or more processing units, cause the one or more processing units to execute operations comprising:
computing, using a neural network and based at least in part on sensor data generated using one or more sensors of a first ego-machine, data representative of one or more vehicle controls for navigating an environment of the first ego-machine, the neural network being trained using ground truth control data generated using a remote control system controlling a second ego-machine as the second ego-machine generates training sensor data; and
generating one or more control commands to perform, using the first ego-machine, one or more operations within the environment based at least in part on the one or more vehicle controls.

10. The system of claim 9, wherein the neural network includes a convolutional neural network (CNN).

11. The system of claim 9, wherein the ground truth control data is generated by:
receiving, from the remote control system, one or more inputs to one or more controls of the remote control system; and
converting the one or more inputs to the ground truth control data.

12. The system of claim 11, wherein the one or more controls include at least one of a steering wheel, a braking component, an acceleration component, a pointer, or a controller.

13. The system of claim 9, wherein the ground truth data and the training sensor data are generated based at least in part on a remote control session between the second ego-machine and the remote control system, further wherein the remote control session includes at least partial control of the second ego-machine being transferred to the remote control system.

14. The system of claim 9, wherein the one or more control outputs include correspond to trajectory information including at least one of a path or points along a path for the first ego-machine to follow.

15. The system of claim 9, wherein the computation, using the neural network, is further based at least in part on state data representative of a state of the first ego-machine, the state including one or more of a speed, velocity, acceleration, deceleration, orientation, pose, location, or position of the first ego-machine.

16. The system of claim 9, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot; or
a system implemented at least partially using cloud computing resources.

17. A method comprising:
generating, during a remote control session between a data collection machine and a remote control system, training sensor data using the data collection machine and control data using the remote control system;
computing, using a neural network and based at least in part on the training sensor data, data representative of one or more control outputs;

comparing the one or more control outputs to ground truth control data generated based at least in part on the control data; and updating one or more parameters of the neural network based at least in part on the comparing.

18. The method of claim 17, further comprising converting the control data to the ground truth control data, wherein the control data corresponds to one or more inputs to the remote control system and the ground truth control data corresponds to one or more controls for the data collection machine.

19. The method of claim 17, wherein, once trained, the neural network is configured to compute the one or more control outputs for controlling an ego-machine through an environment using sensor data generated using one or more sensors of an ego-machine.

20. The method of claim 17, wherein the remote control session includes at least partial control of the data collection machine being transferred to the remote control system such that inputs to the remote control system cause actuation of the data collection machine.

\* \* \* \* \*